(12) United States Patent
Hovhannisyan et al.

(10) Patent No.: US 11,050,624 B2
(45) Date of Patent: Jun. 29, 2021

(54) METHOD AND SUBSYSTEM THAT COLLECTS, STORES, AND MONITORS POPULATION METRIC DATA WITHIN A COMPUTER SYSTEM

(71) Applicant: VMware, Inc., Palo Alto, CA (US)

(72) Inventors: Avetik Hovhannisyan, Yerevan (AM); Ashot Nshan Harutyunyan, Yerevan (AM); Naira Movses Grigoryan, Yerevan (AM); Arnak Poghosyan, Yerevan (AM)

(73) Assignee: VMware, Inc., Palo Alto, CA (US)

( * ) Notice: Subject to any disclaimer, the term of this patent is extended or adjusted under 35 U.S.C. 154(b) by 1034 days.

(21) Appl. No.: 15/195,728

(22) Filed: Jun. 28, 2016

(65) Prior Publication Data
US 2017/0373937 A1 Dec. 28, 2017

(51) Int. Cl.
*H04L 12/24* (2006.01)
*H04L 29/08* (2006.01)

(52) U.S. Cl.
CPC ...... *H04L 41/0853* (2013.01); *H04L 41/0233* (2013.01); *H04L 41/0893* (2013.01); *H04L 67/10* (2013.01)

(58) Field of Classification Search
CPC ............. H04L 41/0853; H04L 41/0233; H04L 41/0893; H04L 43/08; H04L 43/08085; H04L 43/10; H04L 43/106
See application file for complete search history.

(56) References Cited

U.S. PATENT DOCUMENTS

| | | | | |
|---|---|---|---|---|
| 5,535,335 A | * | 7/1996 | Cox | G06F 11/3006 709/221 |
| 2011/0078411 A1 | * | 3/2011 | Maclinovsky | G06Q 10/06 712/30 |
| 2014/0310243 A1 | * | 10/2014 | McGee | G06F 17/30575 707/639 |
| 2015/0142940 A1 | * | 5/2015 | McMurry | H04L 67/16 709/223 |
| 2016/0112287 A1 | * | 4/2016 | Farmer | H04L 43/106 709/224 |

* cited by examiner

*Primary Examiner* — Jason D Recek

(57) ABSTRACT

The current document is directed to methods and subsystems within computing systems, including distributed computing systems, that collect, store, process, and analyze population metrics for types and classes of system components, including components of distributed applications executing within containers, virtual machines, and other execution environments. In a described implementation, a graph-like representation of the configuration and state of a computer system included aggregation nodes that collect metric data for a set of multiple object nodes and that collect metric data that represents the members of the set over a monitoring time interval. Population metrics are monitored, in certain implementations, to detect outlier members of an aggregation.

20 Claims, 36 Drawing Sheets

| | t₁ | t₂ | t₃ | t₄ | t₅ | t₆ | t_{n-1} | t_n |
|---|---|---|---|---|---|---|---|---|
| P1 C1 | | b1 | b2 | b4 | | b22 | b30 | |
| C2 | b1 | b2 | b3 | b11 | b1 | b23 | b1 | b1 |
| C3 | | b6 | b4 | b16 | | b4 | b2 | b2 |
| C4 | b2 | | b7 | b15 | b2 | b11,b15 | b3 | b3 |
| P2 C1 | | b5 | b8 | b14 | b21 | | b28 | |
| C2 | b3 | b3 | b9 | h7 | h7,h6 | d3 | d3 | d3 |
| C3 | | | | h6 | d3 | h10 | d2 | |
| C4 | b4 | b4 | | d3 | d2 | h9,h8 | b31,b32 | |
| P3 C1 | | | d3 | d2 | d1 | h13 | | |
| C2 | d1 | d2 | d2 | d1 | h5,7 | r1 | h13 | |
| C3 | | h4 | h4 | h5 | h6,h3 | r4 | h8 | h8 |
| C4 | | d1 | d1 | h3 | h8 | | h9 | h9 |
| P4 C1 | | | h3 | h3 | h9 | | | |
| C2 | h1 | h3 | h2 | b8 | r1,r2 | | h8 | h8 |
| C3 | h1 | h1 | | b9 | r3 | | h9 | h9 |
| C4 | h2 | h2 | | b20 | r4 | | h8 | |

FIG. 16B

METHOD AND SUBSYSTEM THAT COLLECTS, STORES, AND MONITORS POPULATION METRIC DATA WITHIN A COMPUTER SYSTEM

TECHNICAL FIELD

The current document is directed to automated administration and maintenance subsystems within computer systems, including large distributed computing systems, and, in particular, to methods and subsystems for collecting and storing population metrics for types and classes of components.

BACKGROUND

Computer systems have evolved enormously in the past 60 years. Initial computer systems were room-sized, vacuum-tube-based behemoths with far less computational bandwidth and smaller data-storage capacities than a modern smart phone or even a microprocessor controller embedded in any of various consumer appliances and devices. Initial computer systems ran primitive programs one at a time, without the benefit of operating systems, high-level languages, and networking. Over time, parallel development of hardware, compilers, operating systems, virtualization technologies, and distributed-computing technologies has led to modern distributed computing systems, including cloud-computing facilities, that feature hundreds, thousands, tens of thousands, or more high-end servers, each including multiple multi-core processors, that can access remote computer systems and that can be accessed by remote client computers throughout the world through sophisticated electronic communications. As the complexity of computer systems has grown, the administration and management of computer systems has exponentially grown in complexity, in the volume of data generated and stored for administration and management purposes, and in the computational-bandwidth used for collecting and processing data that reflects the internal operational state of the computer systems and their subsystems and components. While the operational state of an early computer system may well have been encapsulated in a handful of status registers and a modest amount of information printed from teletype consoles, gigabytes or terabytes of metric data may be generated and stored by internal automated monitoring, administration, and management subsystems within a modern distributed computing system on a daily or weekly basis. Collection, storage, and processing of these large volumes of data generated by automated monitoring, administration, and maintenance subsystems within distributed computing systems is rapidly becoming a computational bottleneck with respect to further evolution, expansion, and improvement of distributed computing systems. For this reason, designers, developers, vendors, and, ultimately, users of computer systems continue to seek methods and subsystems to more efficiently store, process, and interpret the voluminous amount of metric data internally generated within distributed computing systems to facilitate automated administration and management of distributed computing systems, including diagnosing performance and operational problems, anticipating such problems, and automatically reconfiguring and repairing distributed-system-components to address identified and anticipated problems.

SUMMARY

The current document is directed to methods and subsystems within computing systems, including distributed computing systems, that collect, store, process, and analyze population metrics for types and classes of system components, including components of distributed applications executing within containers, virtual machines, and other execution environments. In a described implementation, a graph-like representation of the configuration and state of a computer system included aggregation nodes that collect metric data for a set of multiple object nodes and that collect metric data that represents the members of the set over a monitoring time interval. Population metrics are monitored, in certain implementations, to detect outlier members of an aggregation.

BRIEF DESCRIPTION OF THE DRAWINGS

FIGS. 16A-B illustrate aspects of modern, distributed applications that differ from the traditional distributed application discussed above with reference to FIG. 15C.

DETAILED DESCRIPTION OF EMBODIMENTS

The current document is directed to methods and subsystems within computing systems, including distributed computing systems, that collect, store, process, and analyze population metrics for types and classes of system components, including components of distributed applications executing within containers, virtual machines, and other execution environments. In a first subsection, below, an overview of distributed computing systems is provided, with reference to FIGS. 1-10. In a second subsection, the methods and subsystems to which the current document is directed are discussed, with reference to FIGS. 11-19D.

Overview of Distributed Computing Systems

Figure 1:
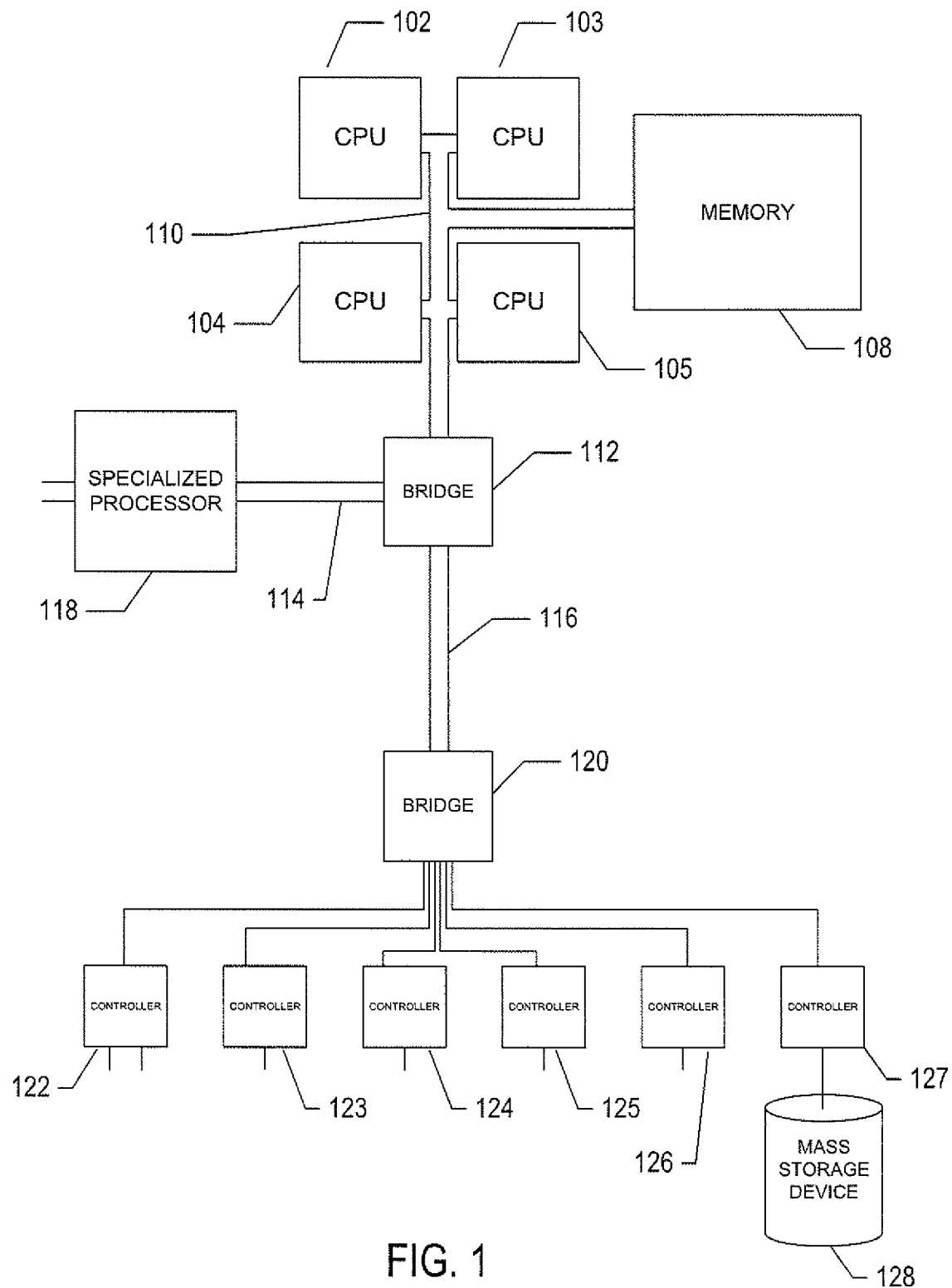
FIG. 1 provides a general architectural diagram for various types of computers.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
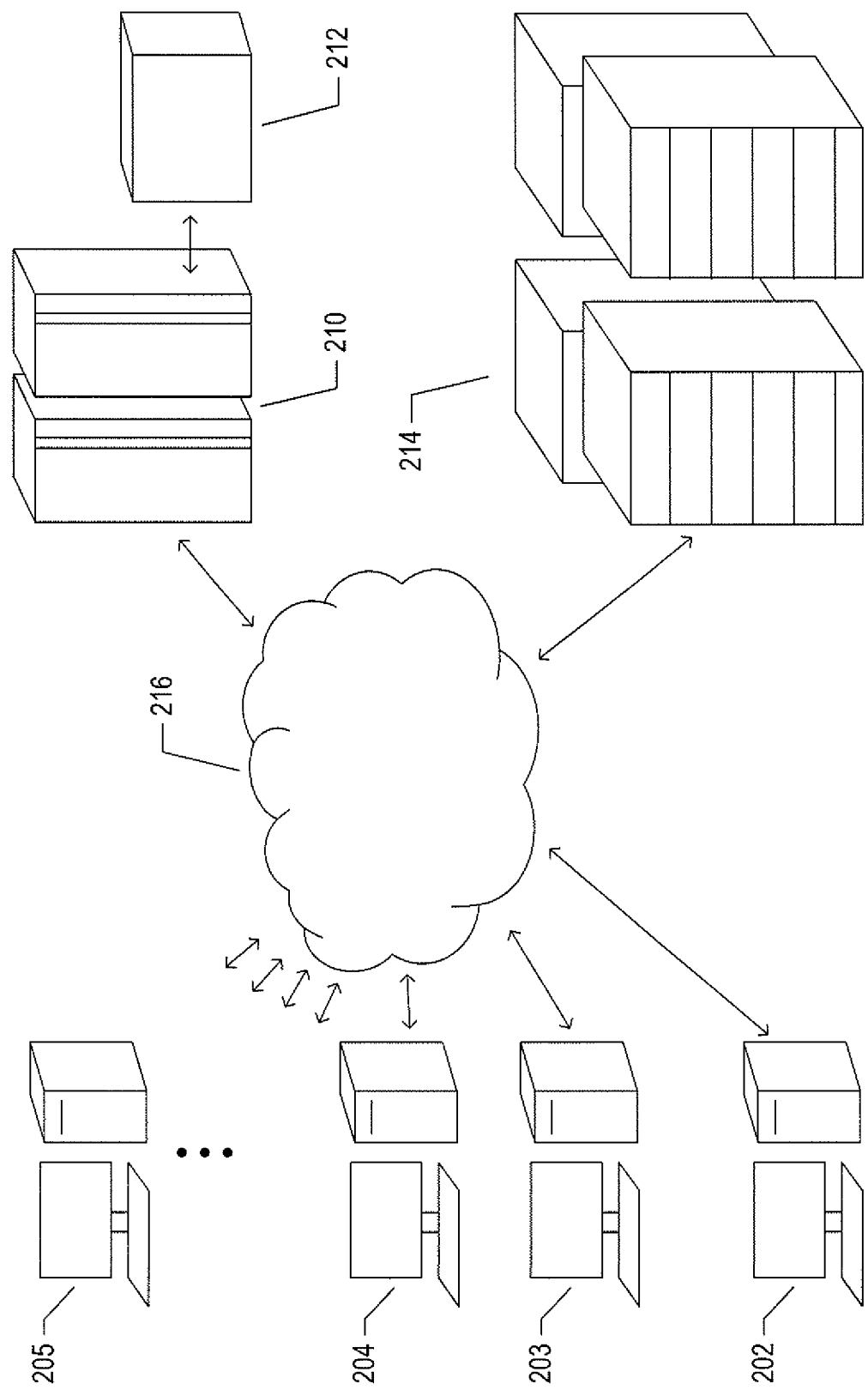
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
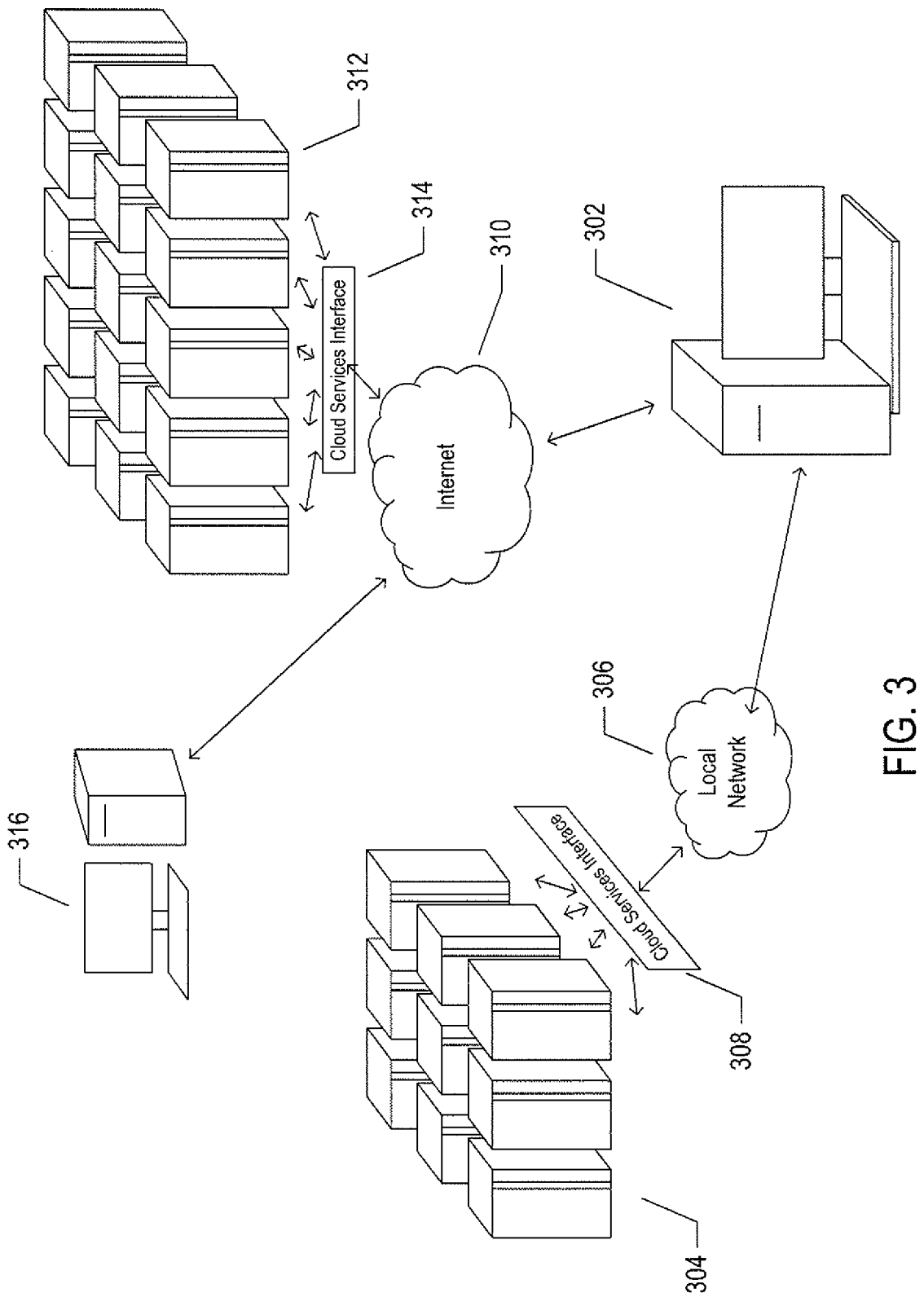
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
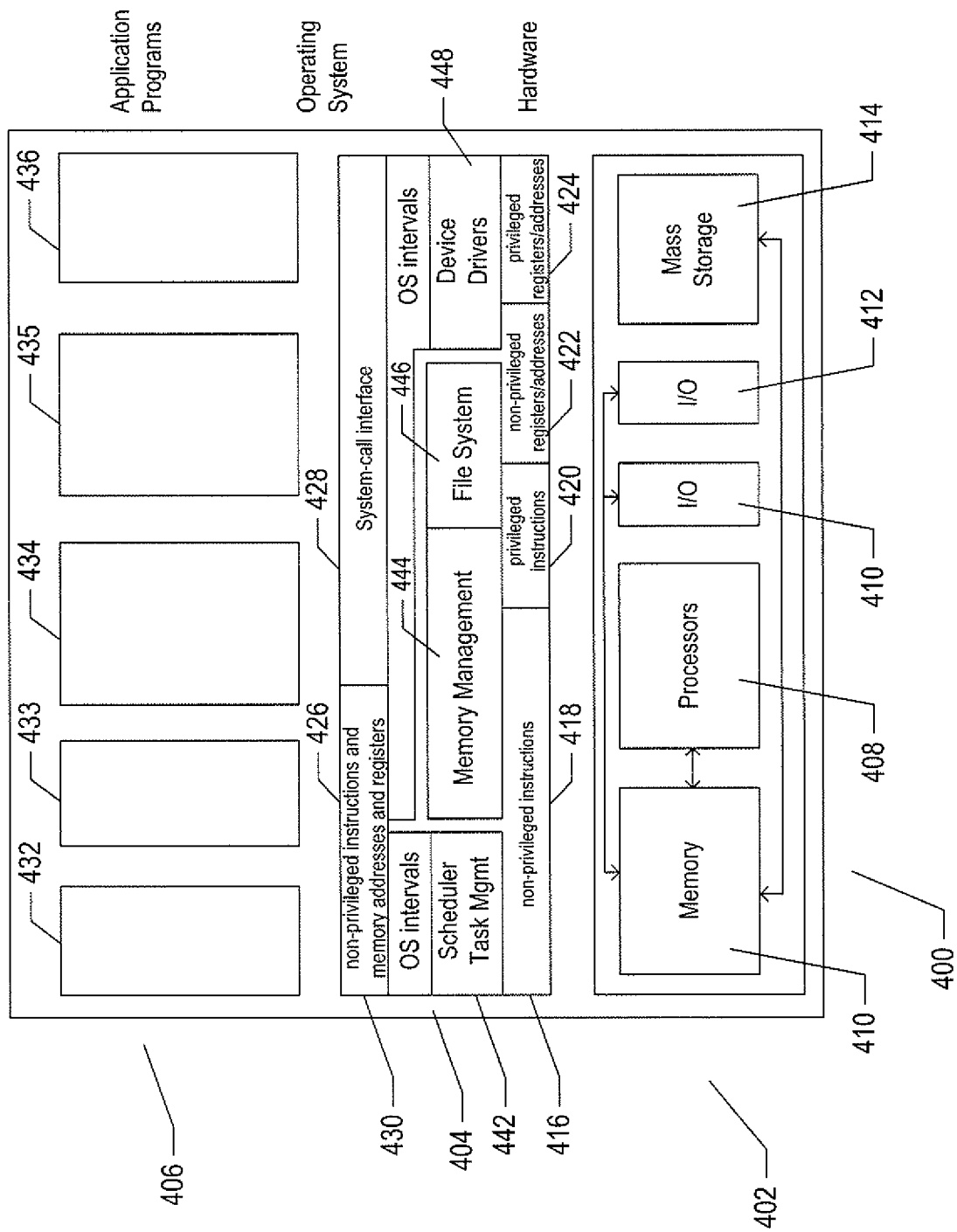
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
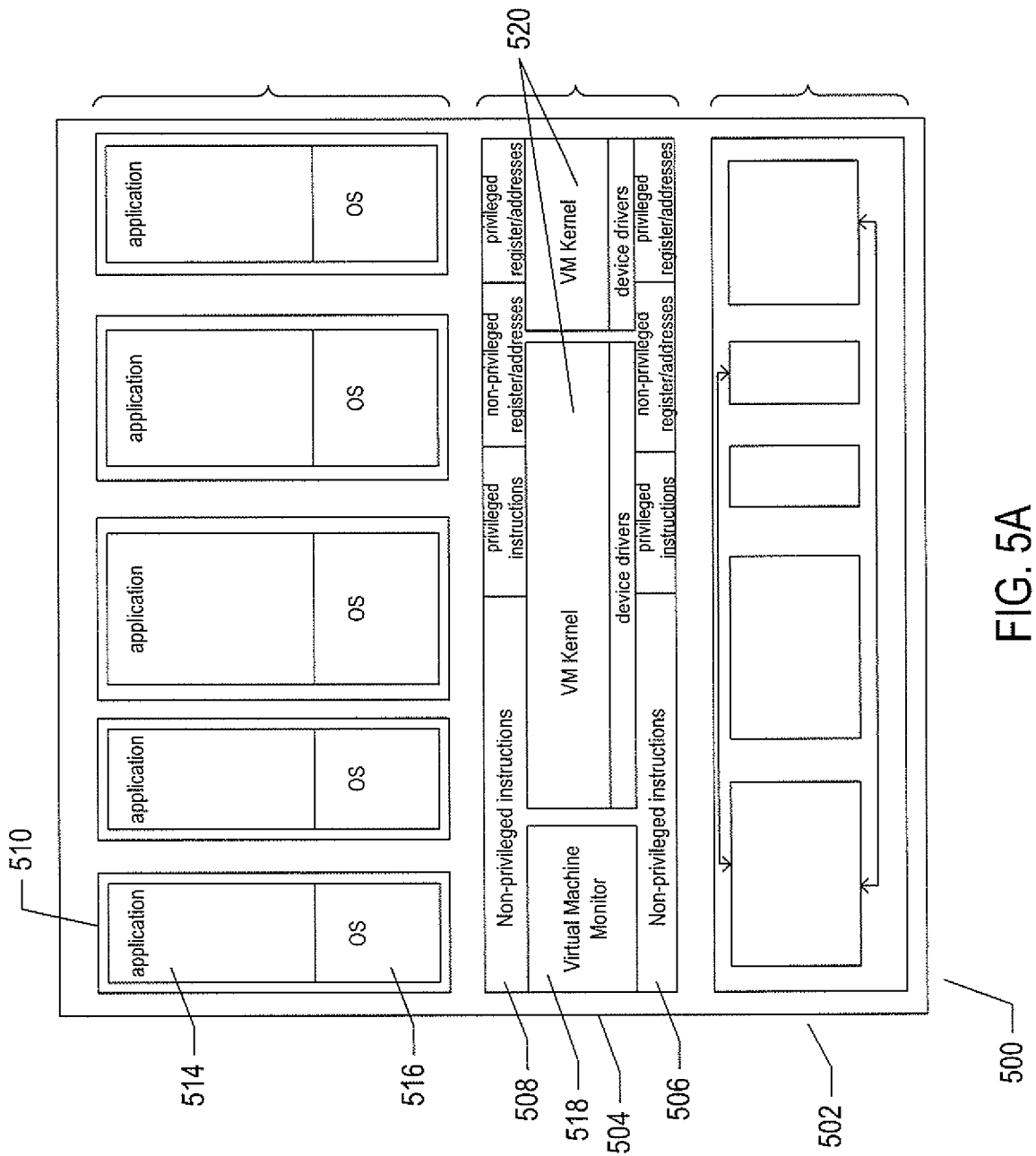
FIGS. 5A-D illustrate several types of virtual machine and virtual-machine execution environments.
Figure 5B:
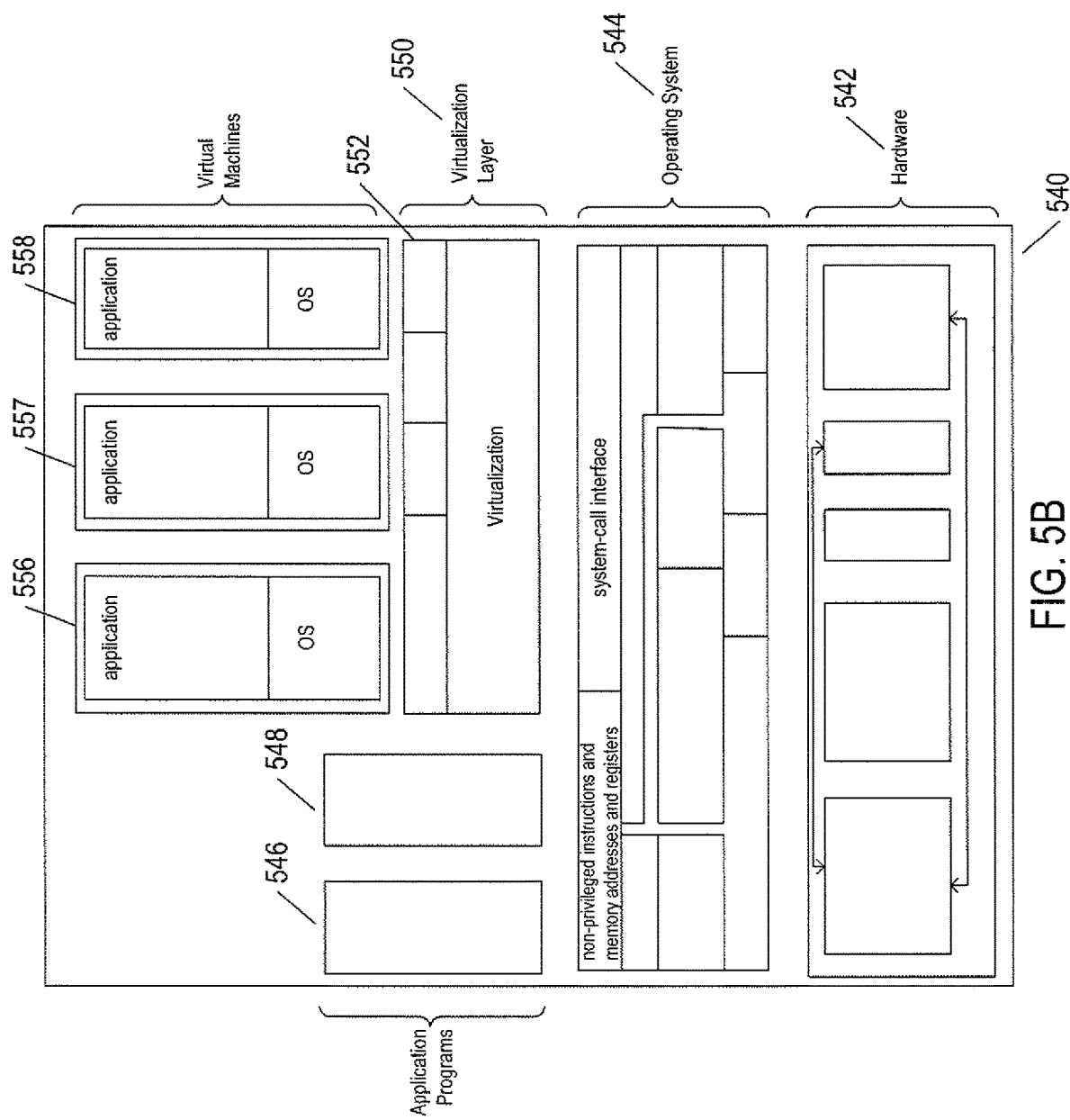

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-D illustrate several types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

Figure 5C:
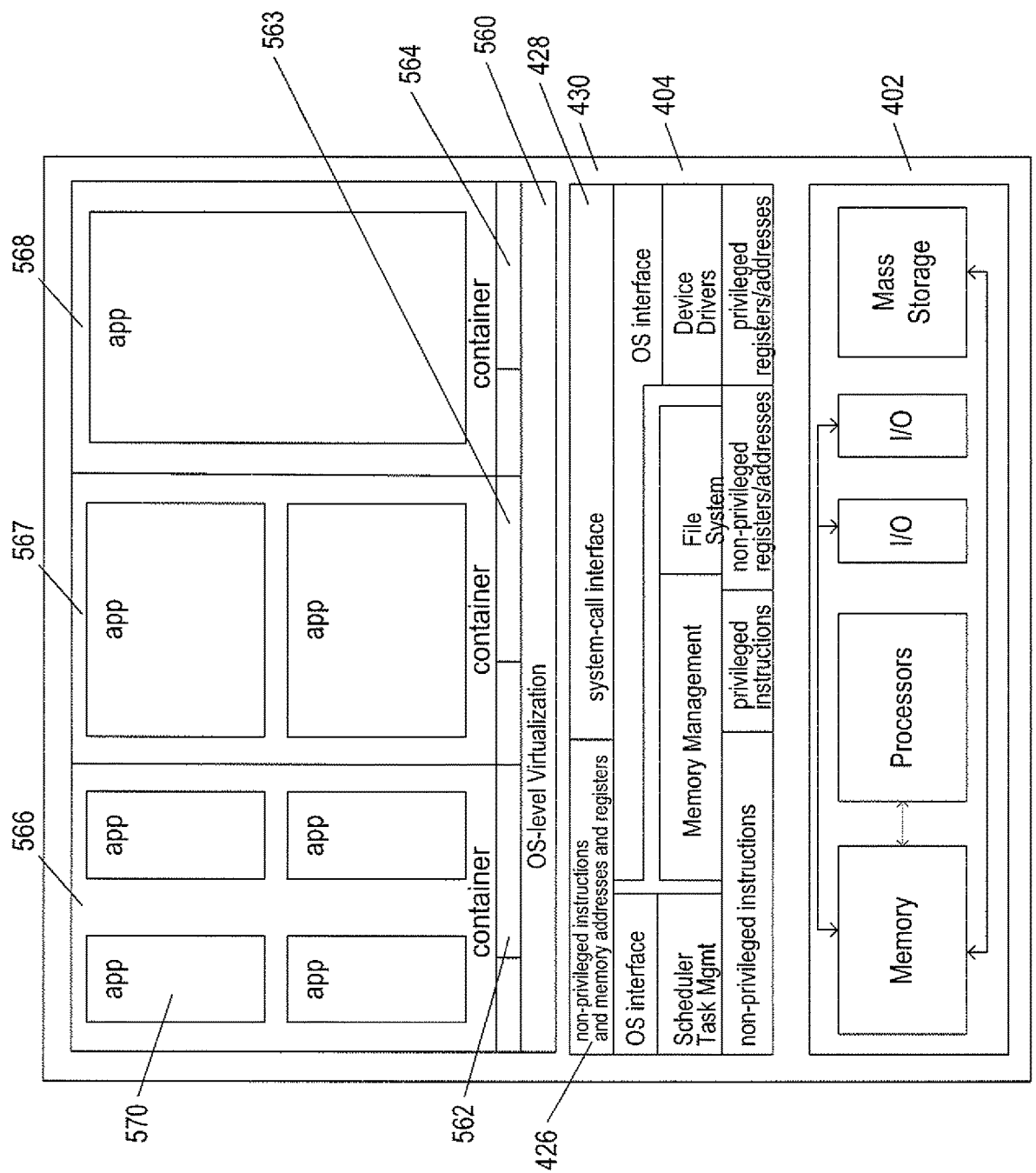

While the traditional virtual-machine-based virtualization layers, described with reference to FIGS. 5A-B, have enjoyed widespread adoption and use in a variety of different environments, from personal computers to enormous distributed computing systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 5C illustrates the OSL-virtualization approach. In FIG. 5C, as in previously discussed FIG. 4, an operating system 404 runs above the hardware 402 of a host computer. The operating system provides an interface for higher-level computational entities, the interface including a system-call interface 428 and exposure to the non-privileged instructions and memory addresses and registers 426 of the hardware layer 402. However, unlike in FIG. 5A, rather than applications running directly above the operating system, OSL virtualization involves an OS-level virtualization layer 560 that provides an operating-system interface 562-564 to each of one or more containers 566-568. The containers, in turn, provide an execution environment for one or more applications, such as application 570 running within the execution environment provided by container 566. The container can be thought of as a partition of the resources generally available to higher-level computational entities through the operating system interface 430. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as name space support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

Figure 5D:
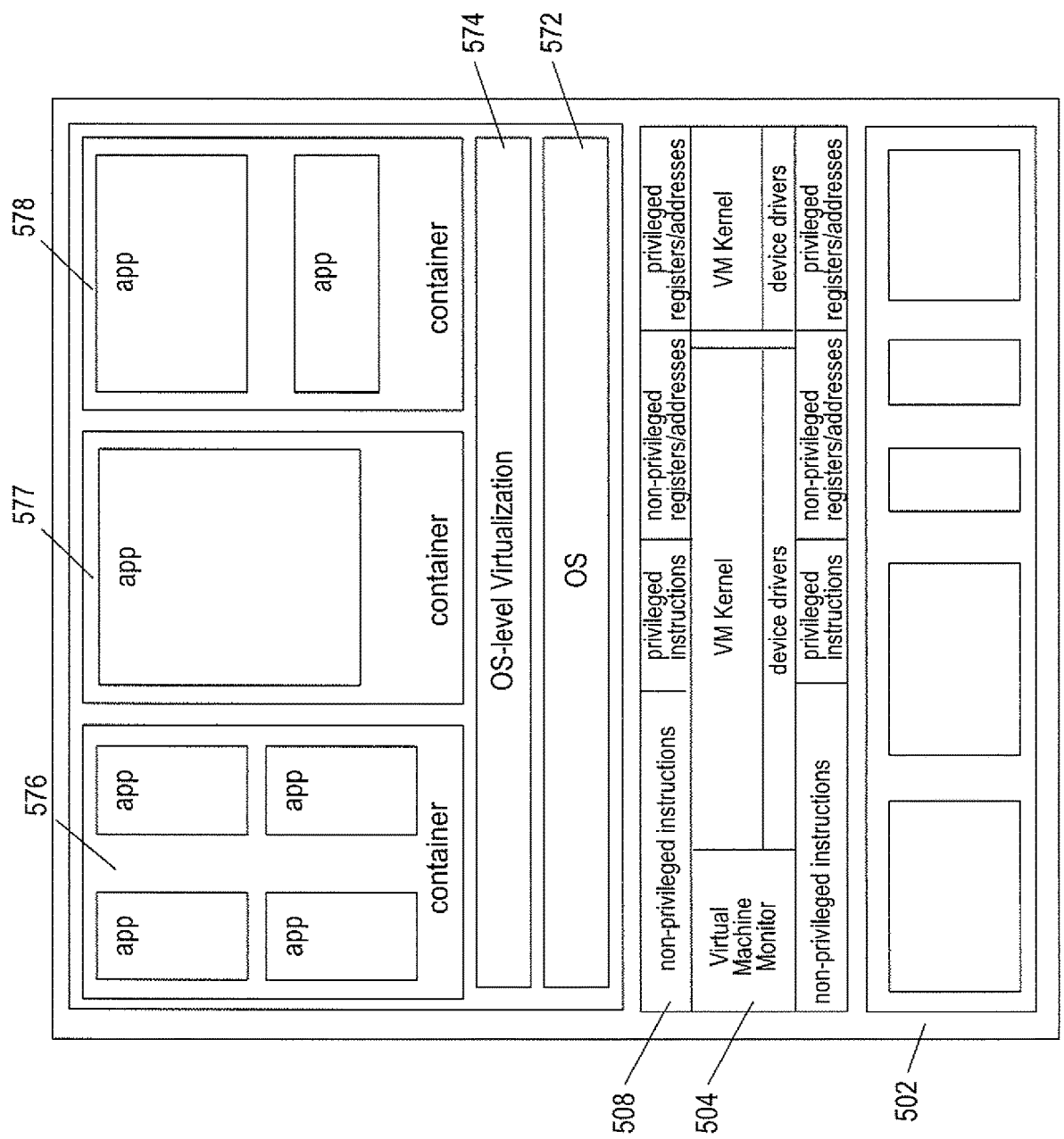

FIG. 5D illustrates an approach to combining the power and flexibility of traditional virtualization with the advantages of OSL virtualization. FIG. 5D shows a host computer similar to that shown in FIG. 5A, discussed above. The host computer includes a hardware layer 502 and a virtualization layer 504 that provides a simulated hardware interface 508 to an operating system 572. Unlike in FIG. 5A, the operating system interfaces to an OSL-virtualization layer 574 that provides container execution environments 576-578 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 574. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 5D, provides much of the advantages of both a traditional virtualization layer and the advantages of OSL virtualization. Note that, although only a single guest operating system and OSL virtualization layer as shown in FIG. 5D, a single virtualized host system can run multiple different guest operating systems within multiple virtual machines, each of which supports one or more containers.

In FIGS. 5A-D, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
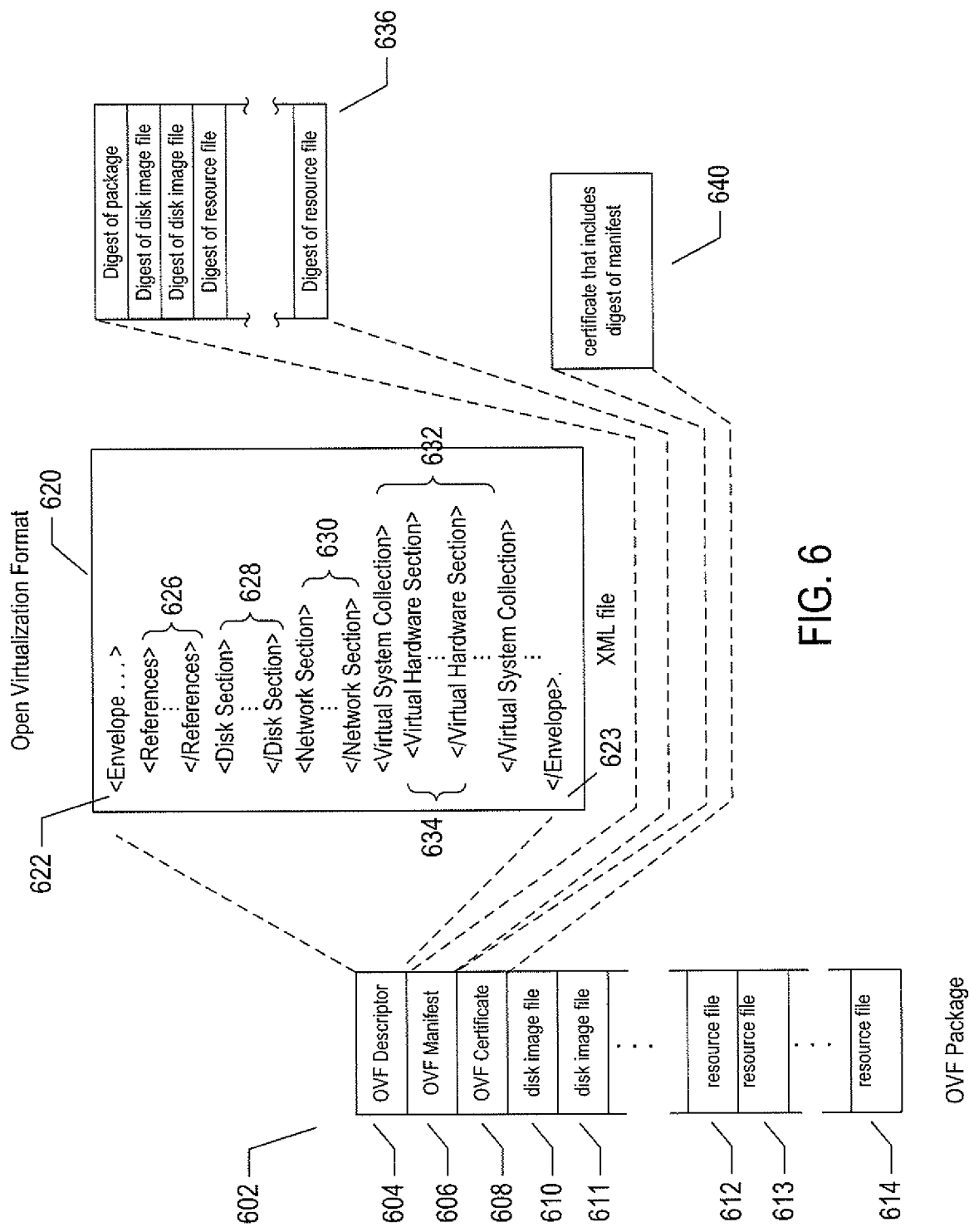
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
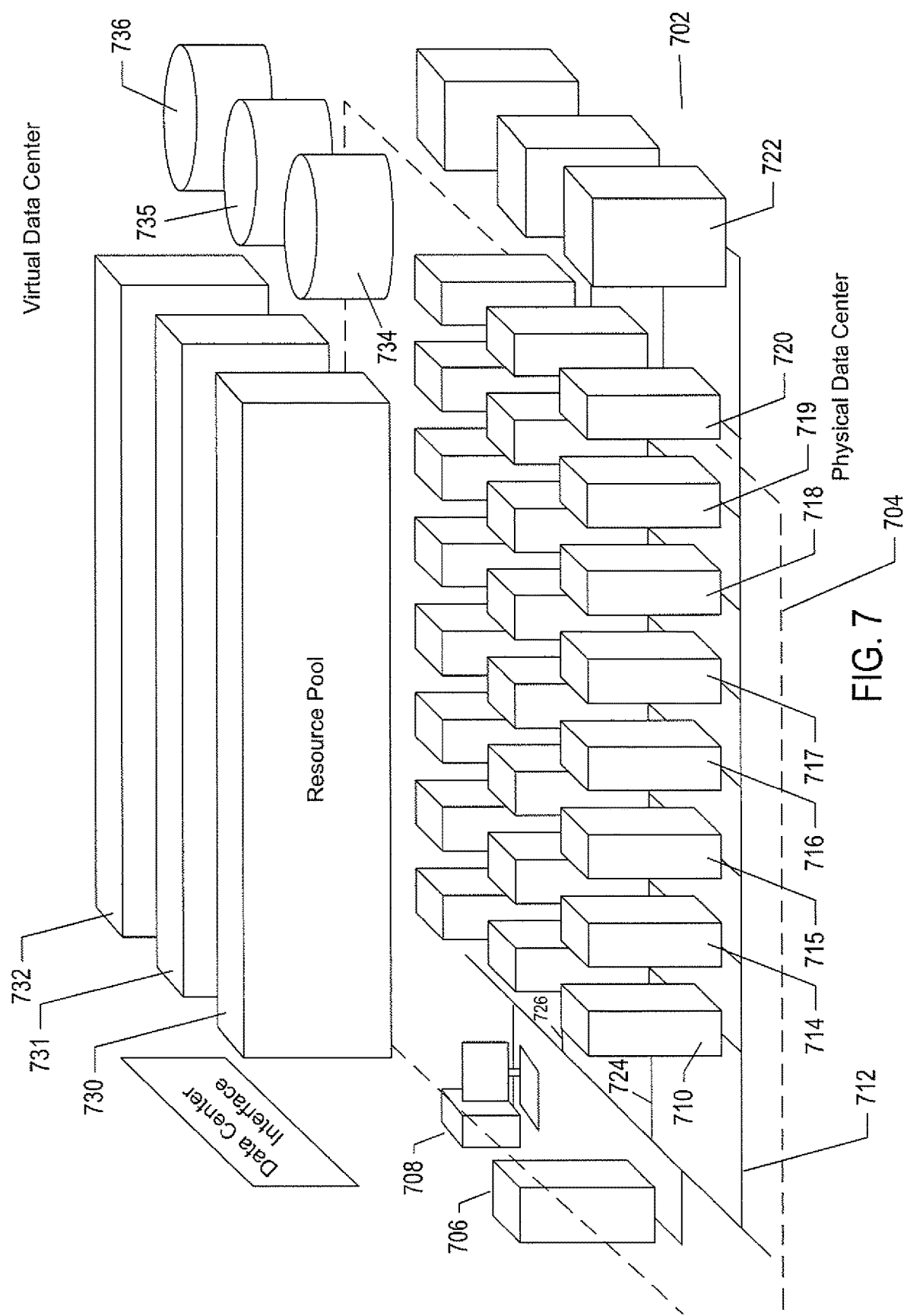
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-managementserver") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
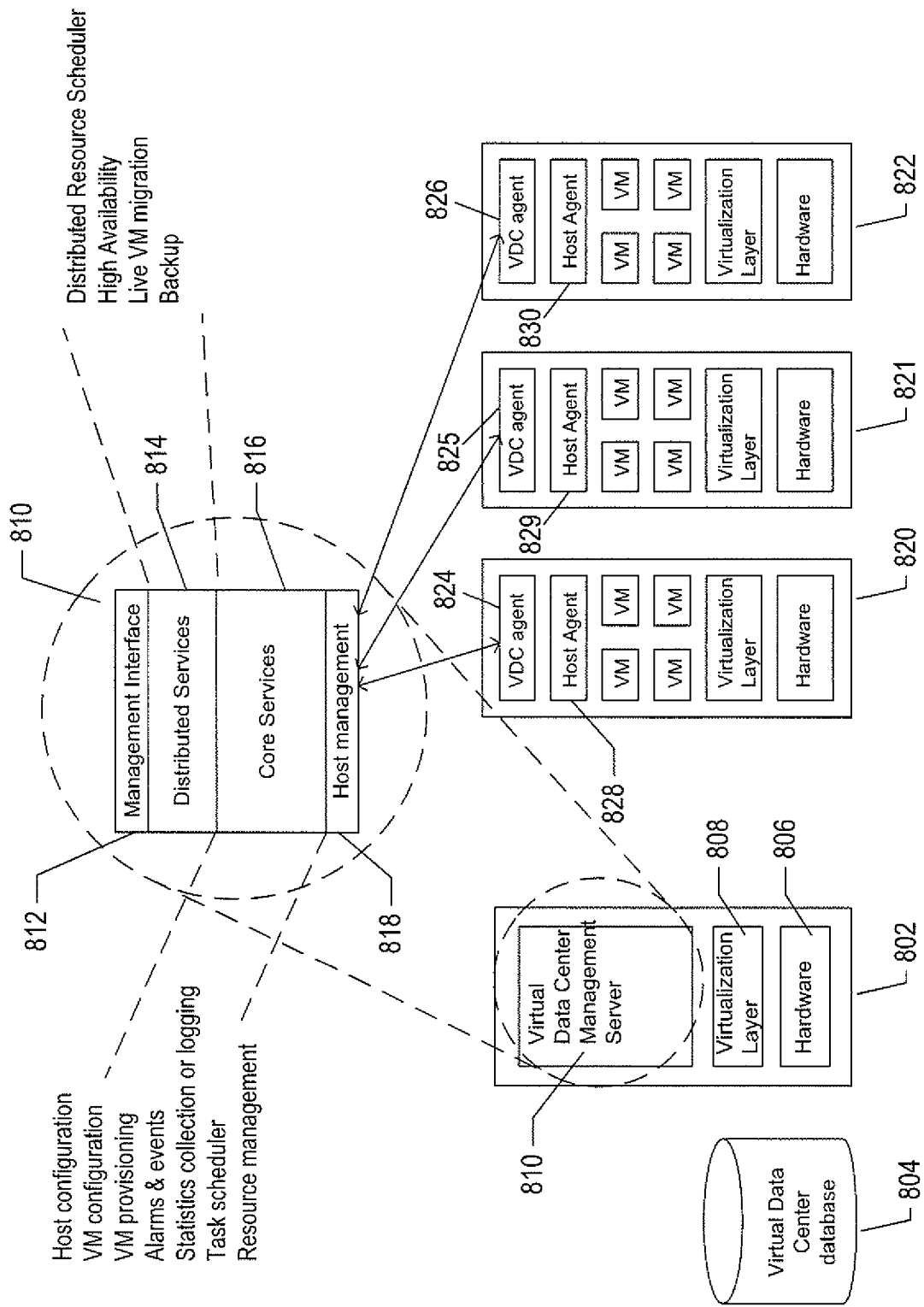
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808, and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
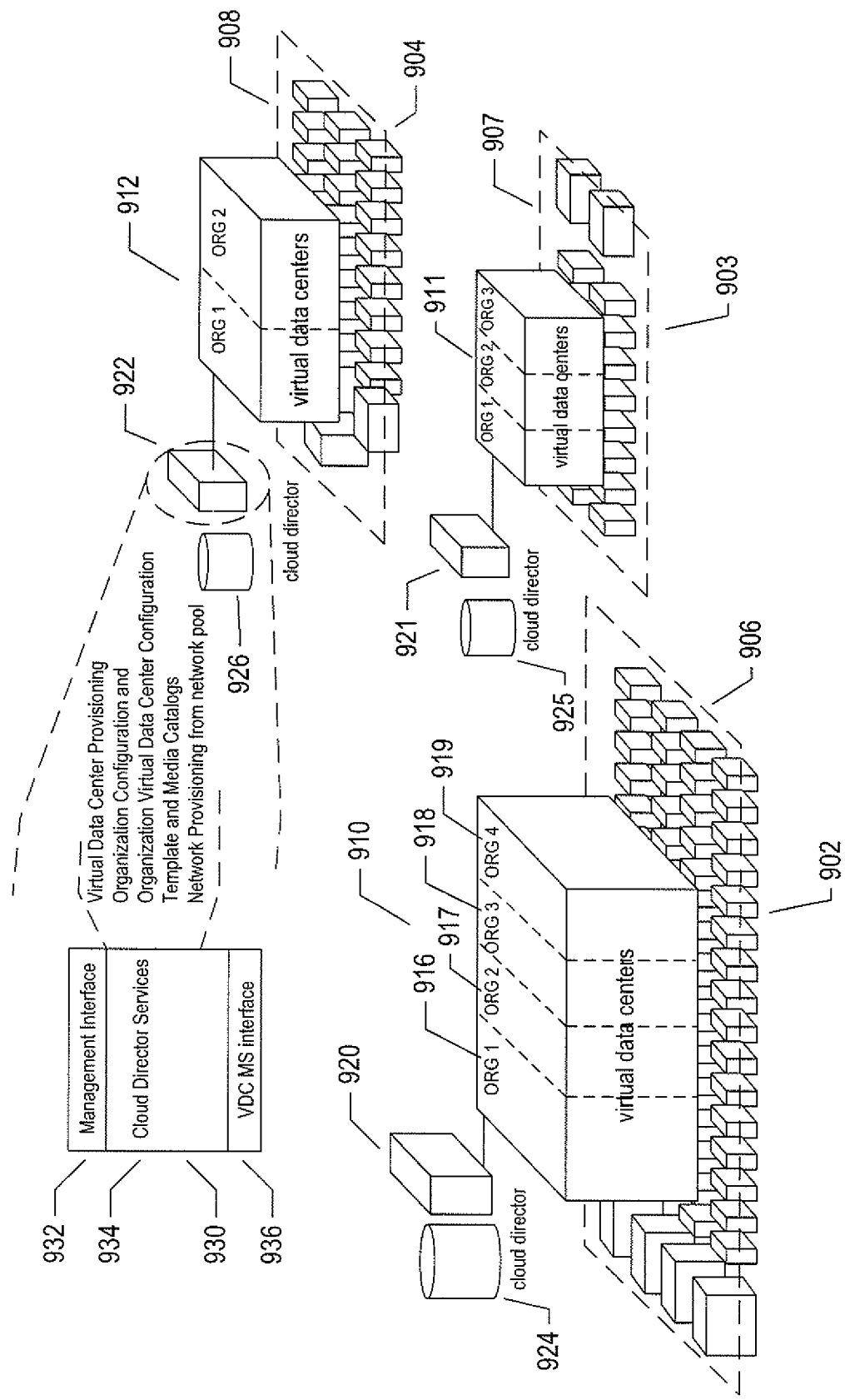
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
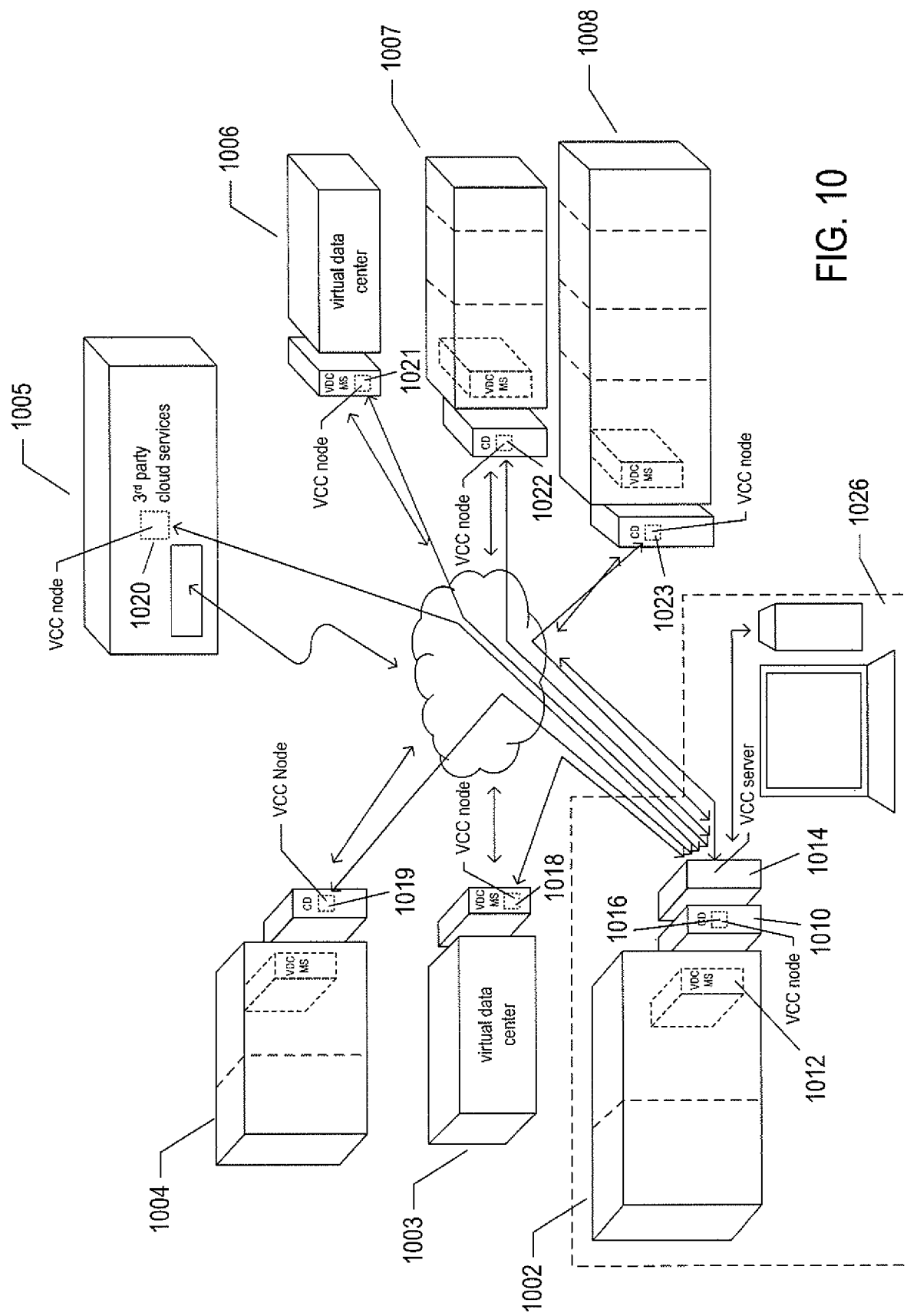
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Method and Subsystems for Compressing Metric Data

Figure 11:
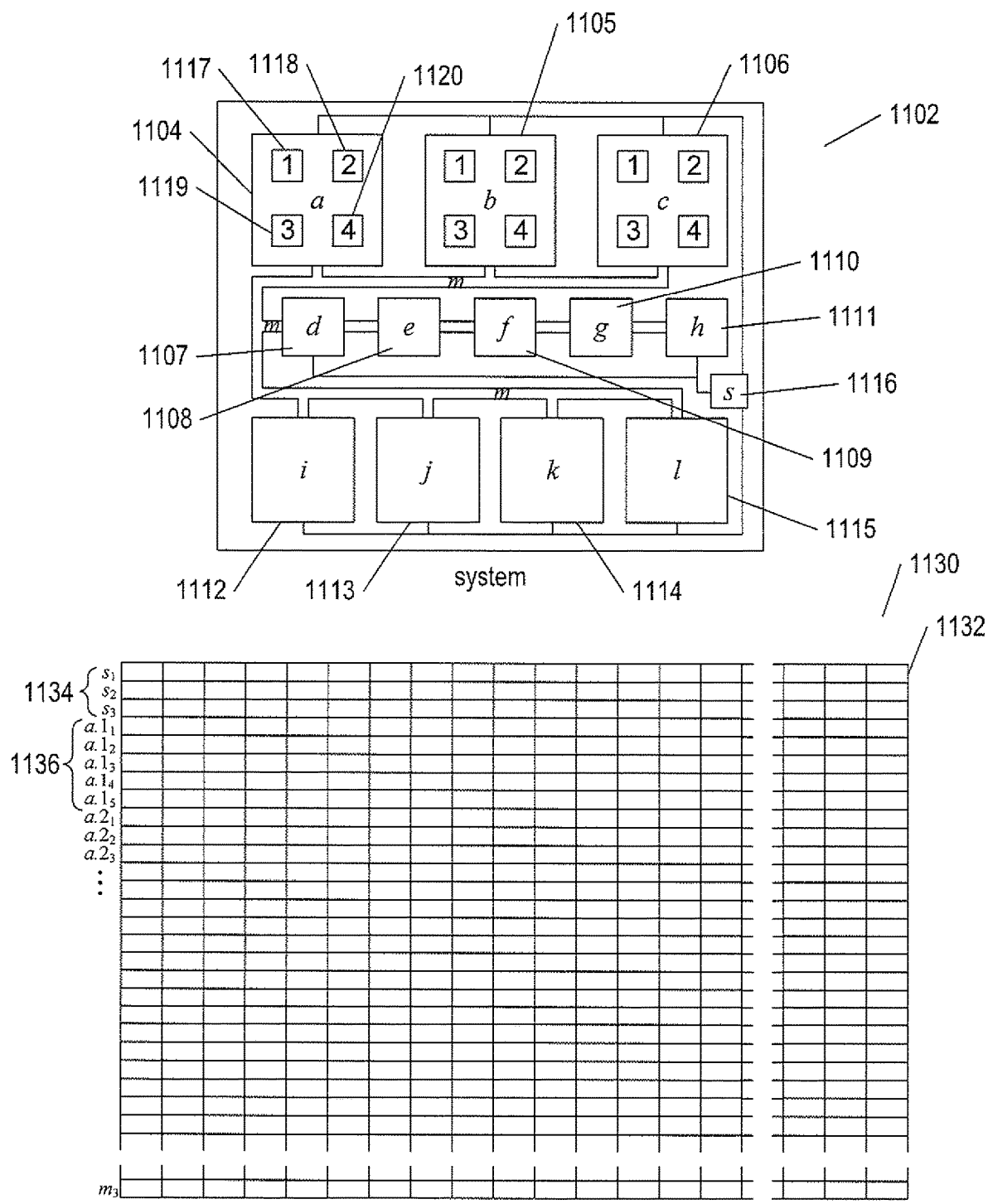
FIG. 11 illustrate metric data that is collected, processed, and used by the administrative and management subsystems within a computer system.

FIG. 11 illustrate metric data that is collected, processed, and used by the administrative and management subsystems within a computer system. At the top of FIG. 11, an abstract system block diagram 1102 is shown. This system includes 11 main subcomponents a-m and s 1104-1116 and four subcomponents in each of components a, b, and c, such as subcomponents 1117-1120 in component a 1104. The system is abstractly characterized and no further details with regard to component functionalities, interfaces, and connections are provided.

In a complex system, various types of information are collected with regard to the operational states and statuses of many, if not all, components, subcomponents, systems, and subsystems. The information can be encoded in many different ways, can be expressed in many different forms, and can be provided by a number of different information sources. For example, metrics may be provided by various types of monitoring applications and monitoring hardware within a computer system. As another example, metrics may be obtained from log files that store various types of log messages and error messages generated by computer-system components. However, for the purposes of the current discussion, this information can be described as a set of time-stamped or time-associated floating-point numbers. Clearly, even for descriptive textural information, there is generally a finite number of different values or forms of the information, as a result of which any such information can be mapped to numeric values. Thus, no generality is lost by considering the information from various types of monitoring and diagnostic agents and subsystems within the system to be floating-point values, also referred to as "metric values" and "metric data." Information may be generated, within the system, with regard to each of the systems, subsystems, components, and subcomponents within a computational system. Thus, the operational state and status of each component, subcomponent, system, and subsystem is described, at any given point in time, by the current values for all attributes reported for the component, subcomponent, system, or subsystem. Table 1130, in the lower portion of FIG. 11, illustrates a portion of the metric data collected for the system shown in block diagram 1102. Each row in the table, such as the first row 1132, represents a time series of metric-data values. The first three rows 1134 of the table represent the data of three different metrics, $s_1$, $s_2$, and $s_3$ for subcomponent s 1116. The next five rows 1136 of table 1130 represent the data stored for five metrics associated with subcomponent 1 (1117 in FIG. 11) of subcomponent a 1104. Additional rows of the table represent data for additional metrics collected for the other components of the abstract computer system represented by block diagram 1102. In an actual computer system, there may be tens or hundreds of different metrics associated with any particular main subcomponent of a distributed computing system, and there may be thousands, tens of thousands, or more subcomponents.

Figure 12:
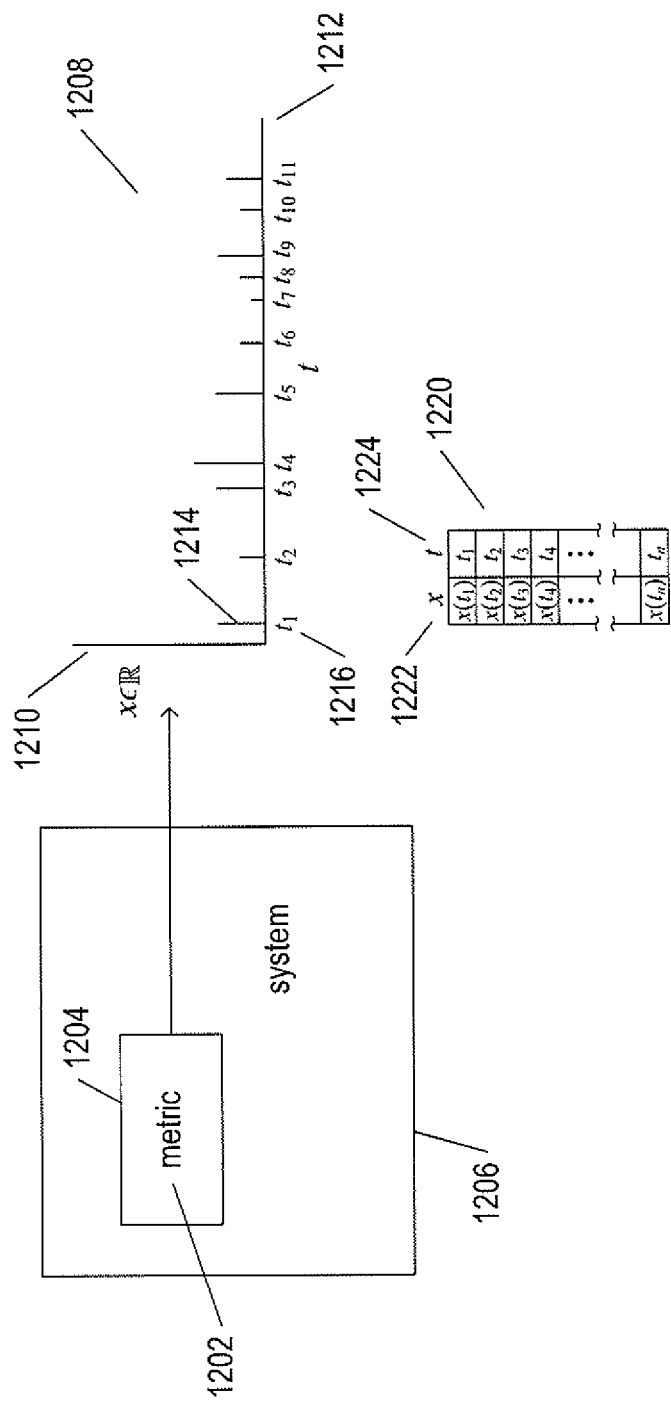
FIG. 12 illustrates metric data.

FIG. 12 illustrates metric data. In FIG. 12, a metric 1202 is shown to be associated with a component 1204 of a system 1206. The metric generates a time-associated sequence of numeric values, a portion of which is shown in plot 1208. The vertical axis represents floating-point values 1210 and the horizontal axis represents time 1212. Each data point is shown in the plot as a vertical bar, such as vertical bar 1214 associated with time $t_1$ 1216, the length of the vertical bar representing a floating-point value. In many cases, a metric outputs data values associated with timestamps over an extended period of time. Often, the data values associated with particular time intervals are compressed and stored in long-term storage. For example, the raw data values may be temporarily stored without compression, and blocks, chunks, or other such portions of these data values may be periodically compressed and stored in long-term storage while newly generated data values continue to accumulate in raw form. The data values for a metric may be alternatively represented by a table 1220 that includes a first column 1222 that stores numeric values and a second column 1224 that stores the associated times or timestamps. As shown in expression 1226 in FIG. 12, the metric may be represented as a series of numeric values $x_k$, each numeric value $x_k$ generated by a function $x(t_k)$, where $t_k$ is the time associated with the $k^{th}$ numeric value $x_k$. There are n numeric values in the metric data $x_k$.

Figure 13:
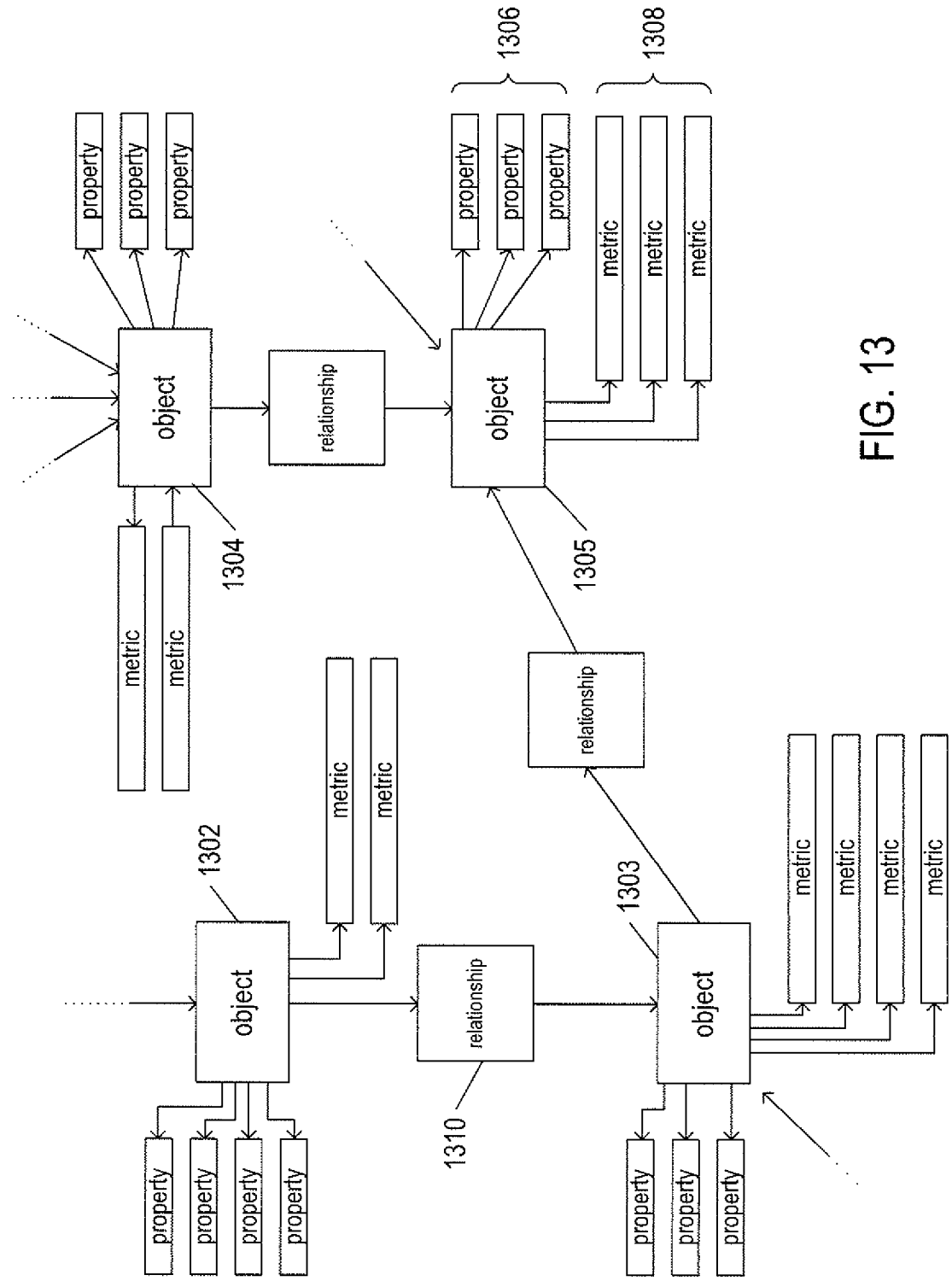
FIG. 13 illustrates a configuration-management database ("CMDB").

FIG. 13 illustrates a configuration-management database ("CMDB"). A CMDB is logically organized as a graph in which various components and subsystems of the computer system are represented by object nodes. The object nodes may be associated with metrics and properties and are linked together via relationship nodes. FIG. 13 shows a small portion of the logical organization of a CMDB representing a current state of a computer system. This portion includes three object nodes 1302-1305. Each object node is associated with multiple properties, such as properties 1306 associated with object node 1305, and multiple metrics, such as metrics 1308 associated with object 1305. Properties are essentially attributes and have values. A property value may be expressed as a string, numeric value, and by other types of encodings. Metrics are generally associated with a sequence of data points, each comprising a data value and an associated timestamp, as discussed above with reference to FIG. 12. Pairs of objects are connected through relationships, such as relationship 1310 connecting object 1302 to object 1303. Object 1302 may, for example, represent a data-storage device, object 1303 may represent a data-storage-device controller, and relationship 1310 may represent a "is a component of" relationship between objects 1302 and 1303. In certain implementations, relationships may express, in addition to one-to-one relationships, one-to-many and many-to-many relationships.

Figure 14A:
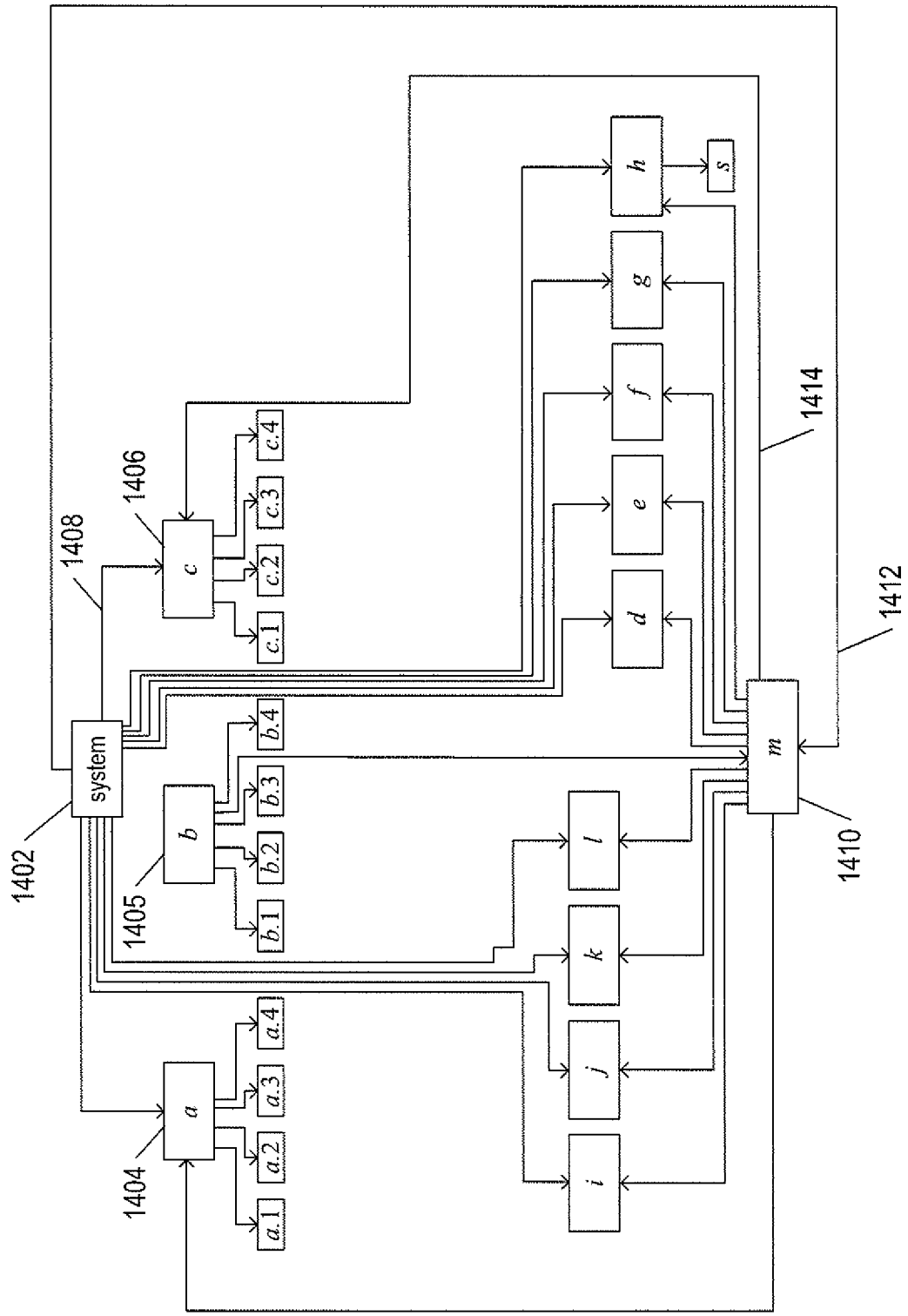
FIGS. 14A-B illustrate a CMBD representation of the hypothetical system 1102 discussed above with reference to FIG. 11.
Figure 14B:
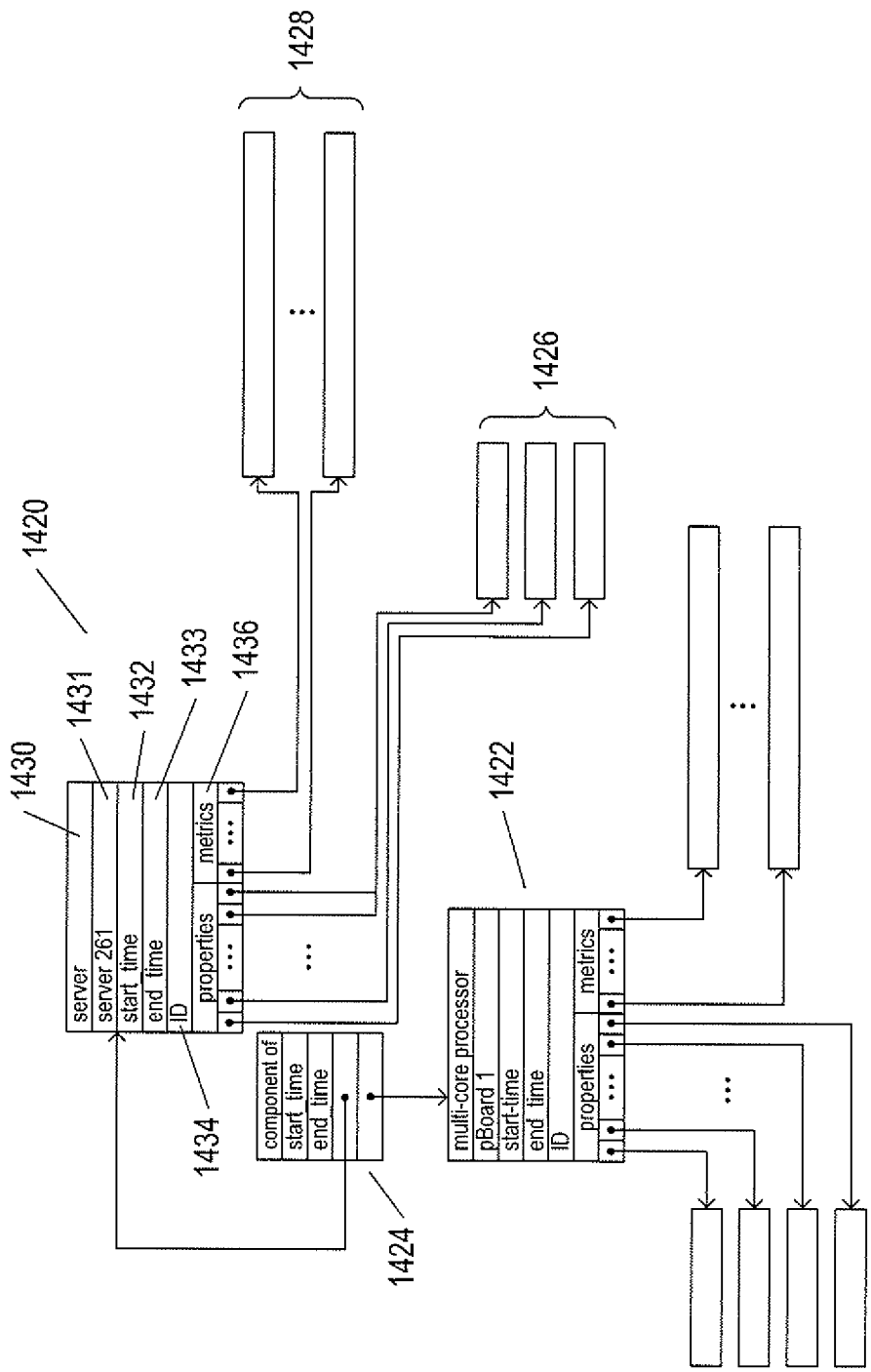

FIGS. 14A-B illustrate a CMBD representation of the hypothetical system 1102 discussed above with reference to FIG. 11. In FIG. 14A, the object nodes of a CMDB representation of the hypothetical system are shown with connecting arrows, rather than relationship nodes, logically connecting the object nodes, with the relationship nodes, properties, and metrics omitted for the sake of clarity. The system as a whole is represented by object node 1402. Subsystems a 1104, b 1105, and c 1106 shown in FIG. 11 are represented by object nodes 1404-1406, respectively. Each arrow connecting object node 1402 and object nodes 1404-1406, such as arrow 1408, represent the "is a component of" relationship. Object node 1410 represents an internal bus m in the hypothetical system 1102. Arrow 412 represents an "is a component of" relationship while the arrows emanating from node 1410 to other object nodes, including arrow 1414, represent an "is connected to" or "provides communications services to" relationship. Were the relationship nodes, properties, and metrics for the small hypothetical system 1102 discussed above with reference to FIG. 11 included in the graph shown in FIG. 14A, it would be far too complex to illustrate in a single-page diagram.

FIG. 14B shows several example nodes of a CMDB at a greater level of detail than shown in FIGS. 13 and 14A. A first object node 1420 represents a server and a second object node 1422 represents a multi-core processor within the server. Relationship node 1424 represents a "is a component of" relationship between the server 1420 and multi-core processor 1422. Both object nodes 1420 and 1422 are linked to multiple property nodes and metric nodes, including property nodes 1426 and metric nodes 1428 linked to object node 1420. The server node 1420 includes a variety of different fields, including a type field 1430, a name field 1431, a start-time field 1432, an end-time field 1433, and an ID field 1434. In addition, the server node includes references or links 1436 to the various property and metric nodes 1426 and 1428 to which the server node is linked. Similarly, the multi-core-processor node 1422 includes multiple fields. Each node includes a start-time and end-time field that indicates when the node was initially added to the CMDB representation of the system and, in case a node is subsequently deleted, the delete time. CMDB nodes may contain many additional fields and information. The details of the property and metric nodes are not shown in FIG. 14B, but each of these node types also include multiple fields.

The CMDB-like graph representation of the configuration and state of a computer system is used, in the following discussion, as an example of an organization and implementation of a metric-data-collection subsystem. The population metrics discussed below can, however, be implemented in many other types of metric-data-collection subsystems.

Figure 15A:
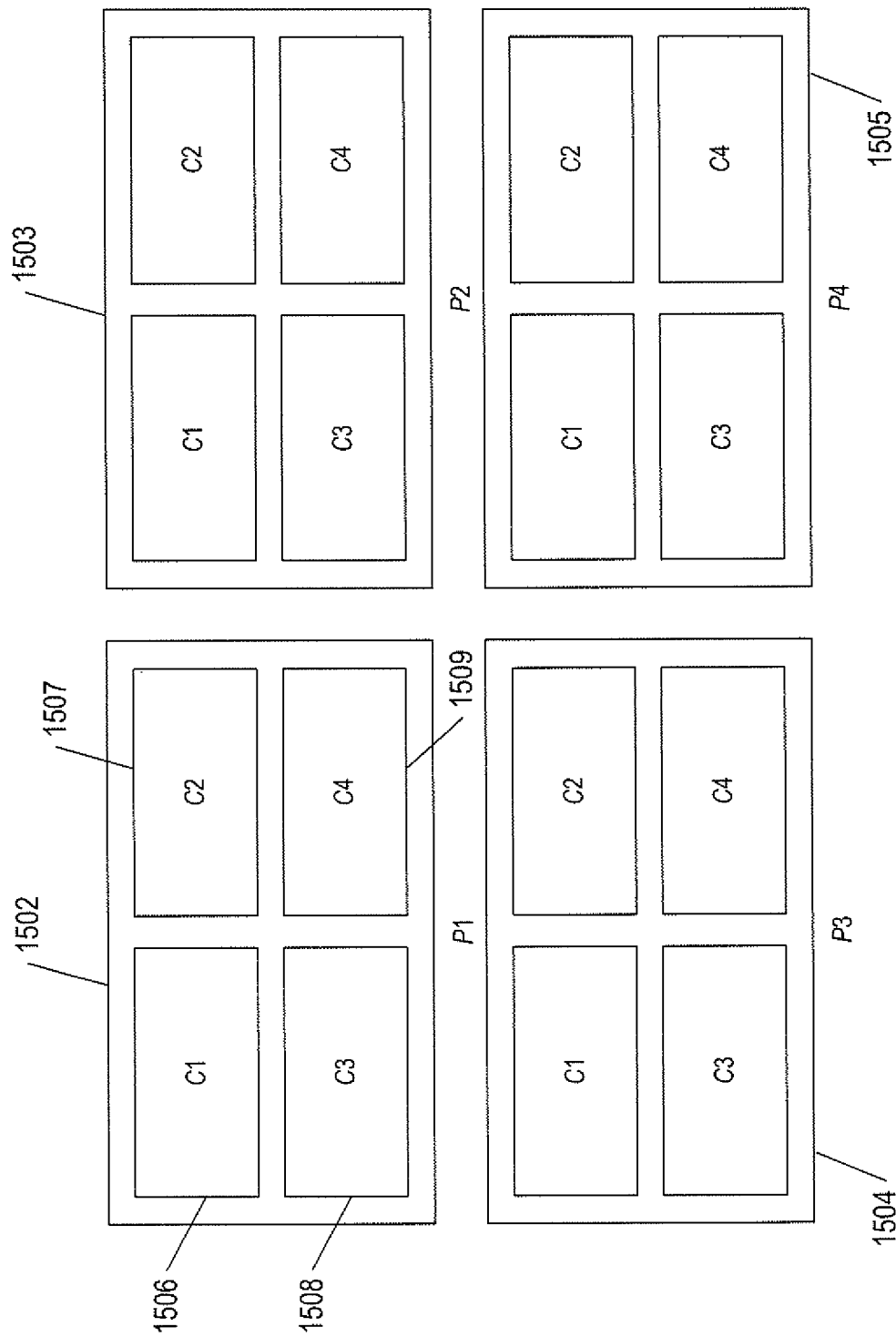
FIGS. 15A-F illustrate a typical CMDB-like representation of the state of a system that includes a distributed application running within a multi-processor system.

FIGS. 15A-F illustrate a typical CMDB-like representation of the state of a system that includes a distributed application running within a multi-processor system. For ease of discussion and illustration, a system with four multi-core processors is described, but the same principles and concepts would apply to very large distributed computer systems that include tens of thousands or more servers. FIG. 15A illustrates the four multi-core processors, in block-diagram form. The four multi-core processors 1502-1505 are designated "P1," "P2," "P3," and "P4." Each multi-core processor, including multi-core processor 1502, includes four cores 1506-1509, designated "C1," "C2," "C3," and "C4."

Figure 15B:
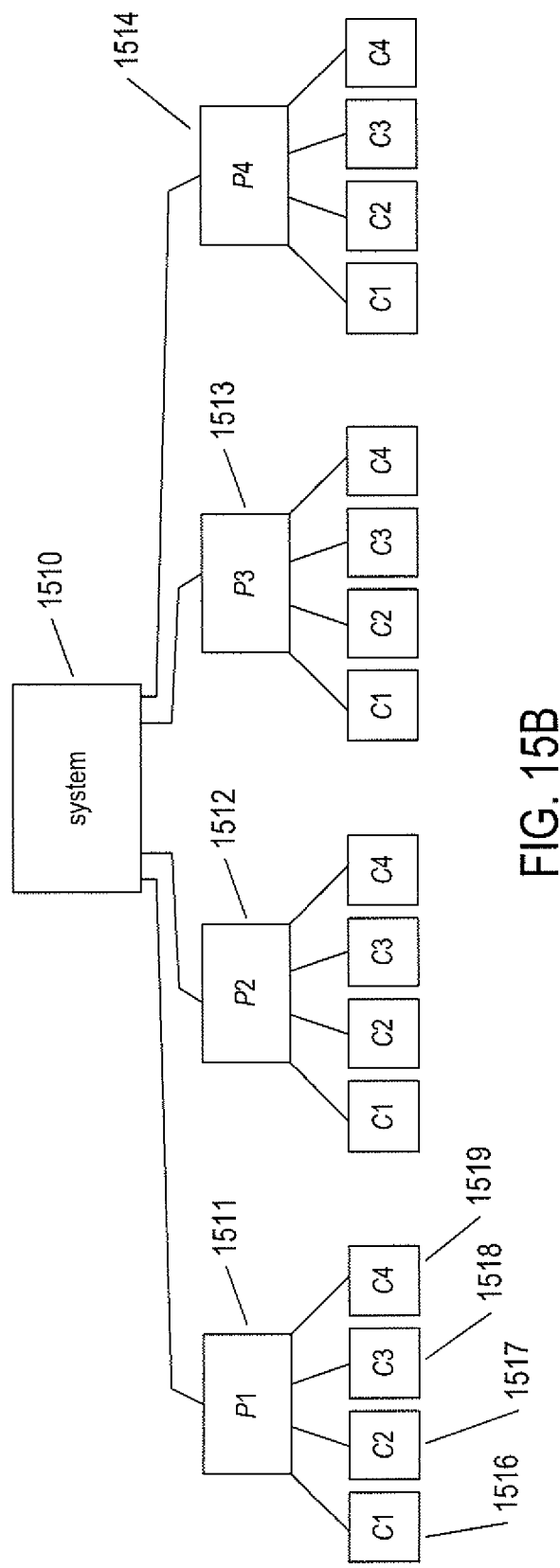

FIG. 15B shows an abbreviated CMDB-like graph-like representation of a system that includes the four multi-core processors discussed above with reference to FIG. 15A. The CMDB-like graph-like representation includes a system object node 1510, four multi-core-processor object nodes 1511-1514, and 16 core object nodes, including core-object nodes 1516-1519 linked to processor object node 1511. Of course, an actual CMDB representation of the configuration and state of even a small system would be much larger and more complex and would include many additional object, relationship, metric, and property nodes.

Figure 15C:
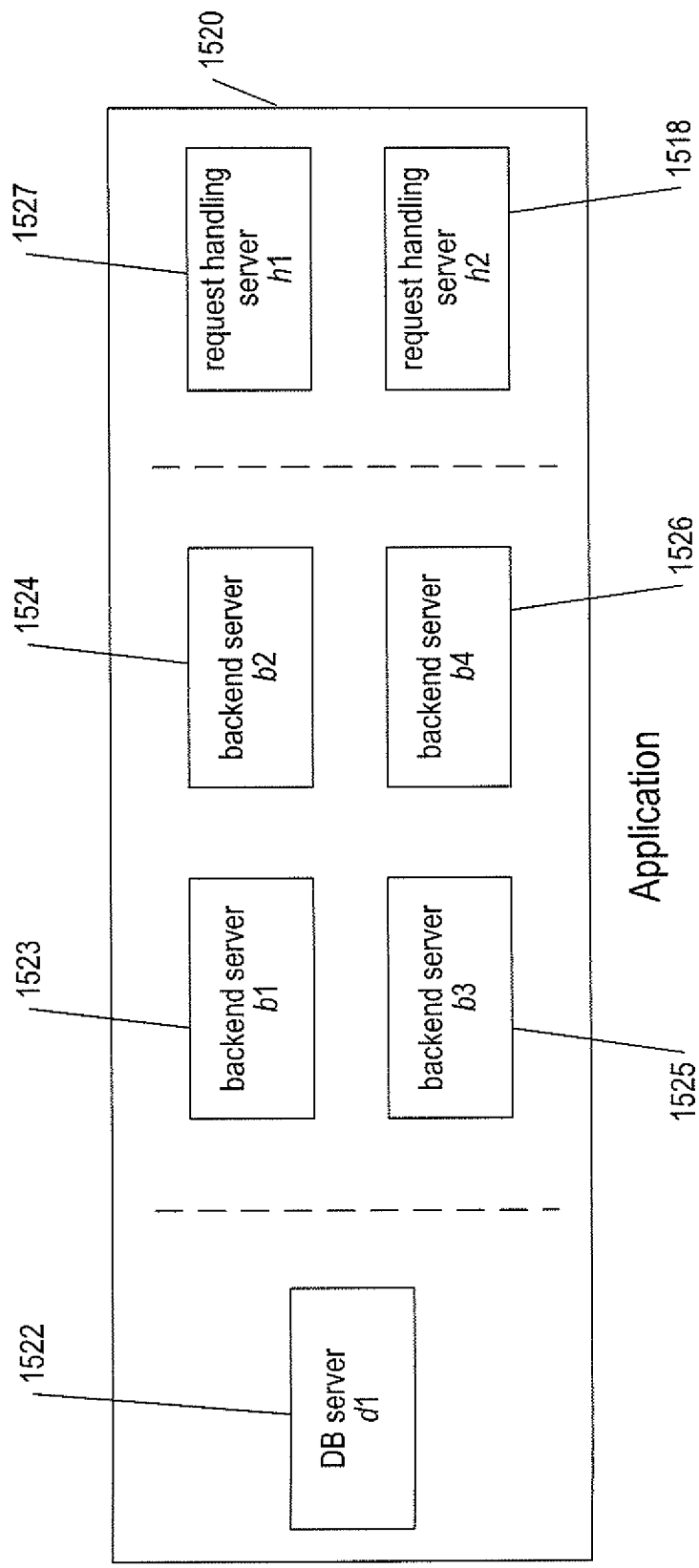

FIG. 15C illustrates a traditional distributed application. The traditional distributed application 1520 includes seven distributed components 1522-1528, each of which runs within a virtual machine and/or container that, in turn, runs on one of the cores of a multi-processor core. The illustrated application includes two request-handling servers 1527-1528, referred to as components "h1" and "h2," for backend servers 1523-1526, referred to as "b1," "b2," "b3," and "b4," and a database server 1522, referred to as "d1." The application may, for example, represent a distributed web-server application that executes client requests by returning web pages that include information extracted from a database by the database server 1522.

Figure 15D:
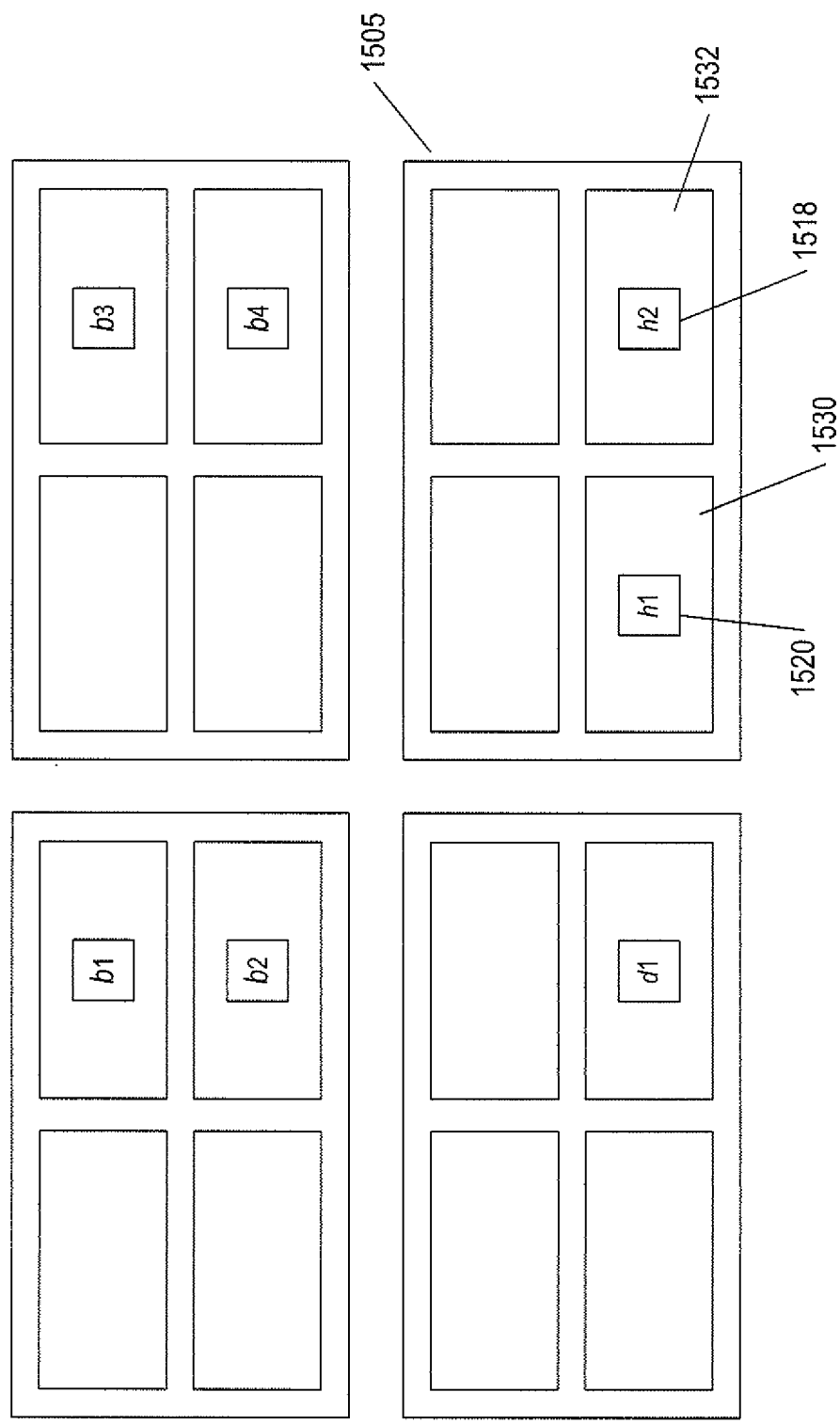

FIG. 15D illustrates a mapping of the seven components of the example application, discussed above with reference to FIG. 15C, to cores within the four multi-core processors discussed above with reference to FIG. 15A. As shown in FIG. 15D, each application component is mapped to a different core. For example, components h1 and h2 1520 and 1518 are mapped to cores C3 and C4 1530 and 1532 of multi-core processor P4 1505. In traditional distributed applications, as discussed further below, these mappings of application components, running within virtual machines and/or containers, to processor cores is relatively stable.

Figure 15E:
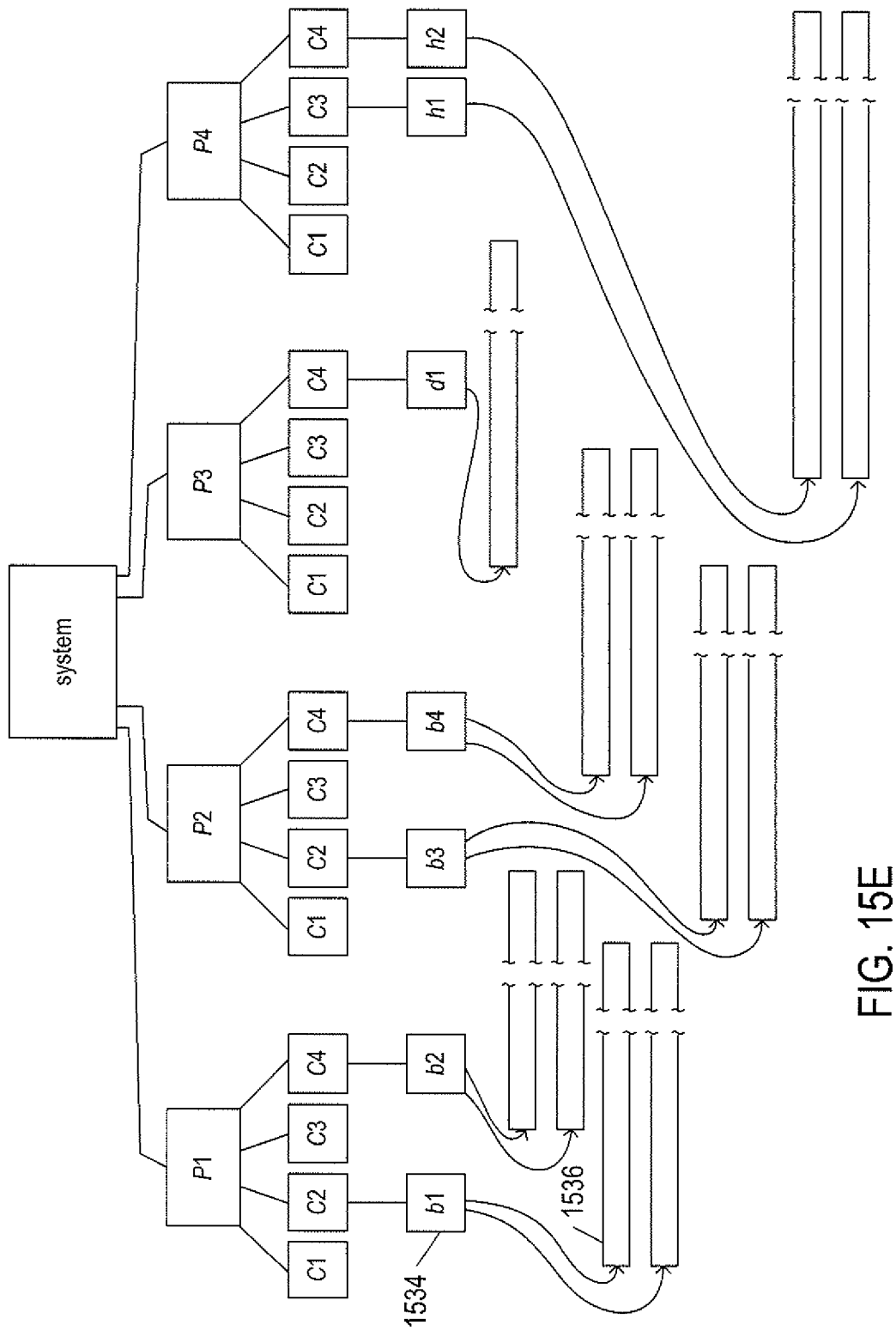

FIG. 15E illustrates a CMDB-like graph-like representation of the system and distributed application discussed above with reference to FIGS. 15A-C. Again, the graph-like representation of the system configuration and state shown in FIG. 15E is only a very small portion of a full state-and-configuration representation for a multi-processor system. The graph-like state-and-configuration representation shown in FIG. 15B is supplemented to include object nodes that represent the application components, such as object node 1534 that represents application component b1. Each of these application-component object nodes include links to metric nodes, such as metric node 1536, which include containers for accumulating metric data points over time. A metric node may include various fields describing the type of metric, start time and end time for the metric, and other such information as well as a variable-length container for storing a time-ordered sequence of data points, as discussed above with reference to FIG. 12B.

Figure 15F:
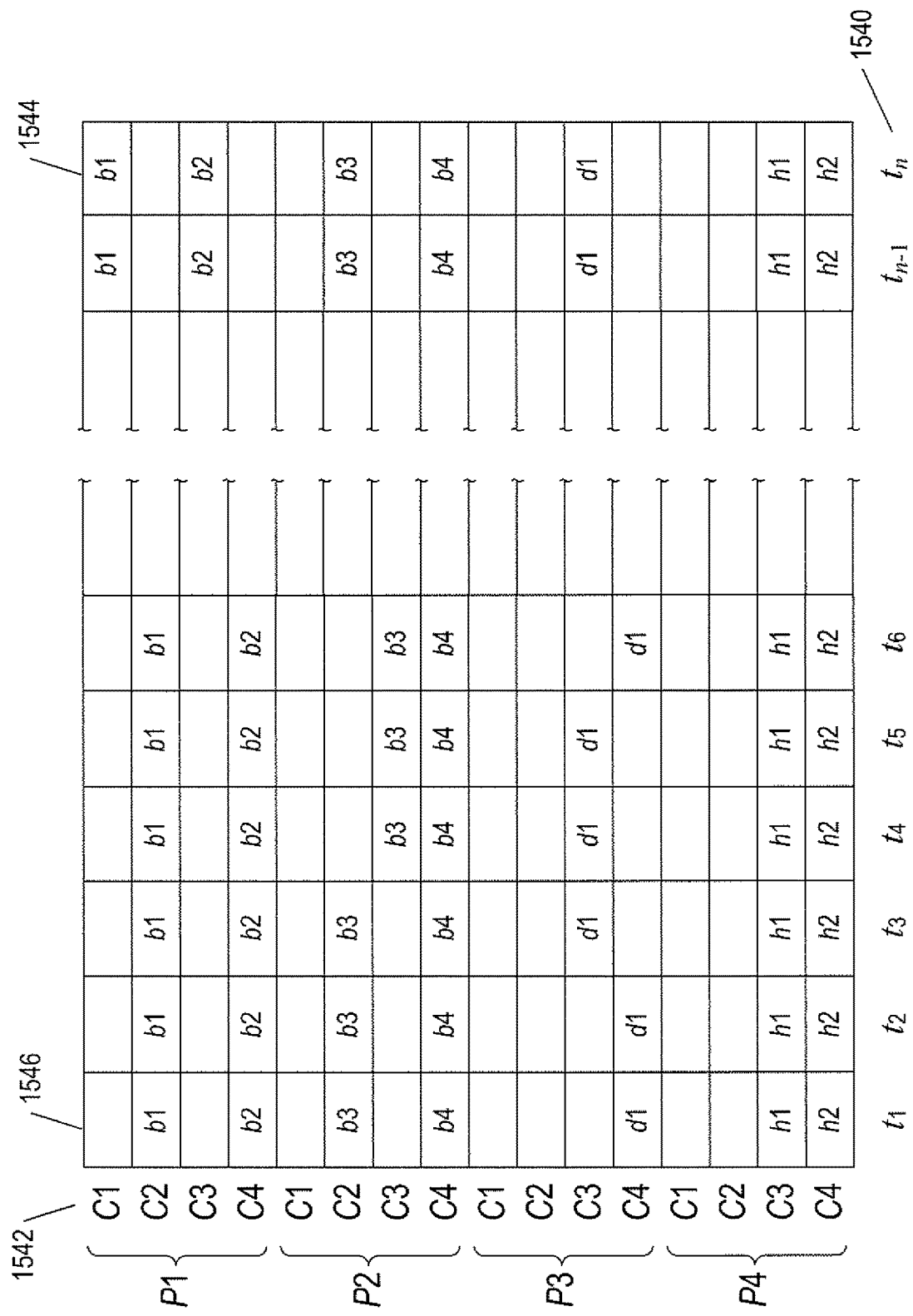

FIG. 15F provides a two-dimensional table-like representation of the mappings of application components of the application discussed above with reference to FIG. 15C onto the system discussed above with reference to FIGS. 15A-B. A horizontal axis 1540 represents a timeline, with each column in the table-like representation representing the mapping of components to cores at a particular point in time. A vertical axis 1542 represents the 16 cores within the four multi-core processors. Entries in the cells of the table represent a mapping of an application component to a particular core. As can be seen by viewing these mappings in left-to-right fashion through the table-like representation, the mappings of application components to cores is relatively stable. The final mapping at timepoint $t_n$ 1544 does not differ appreciably from the initial mapping 1546 at timepoint $t_1$.

Figure 16A:
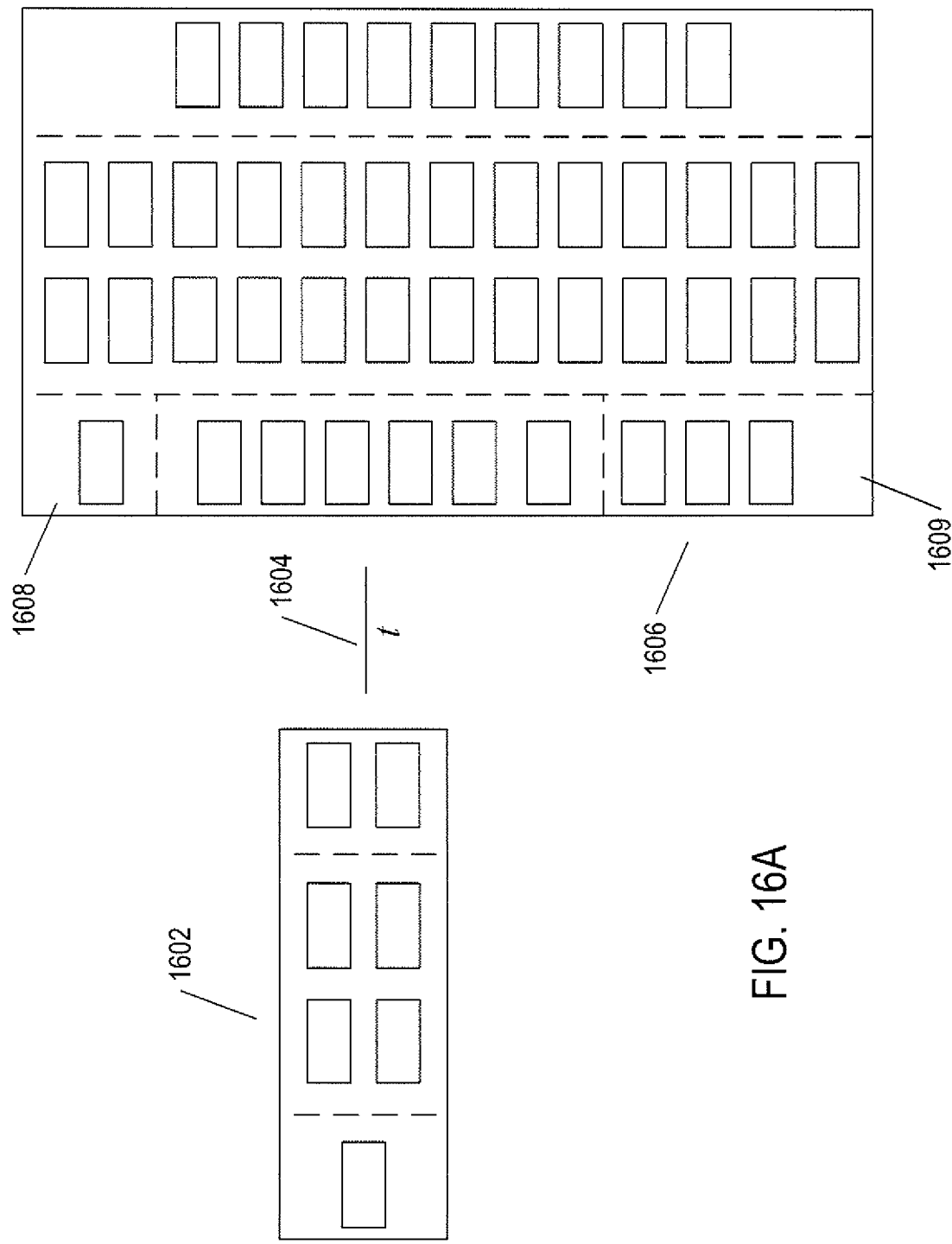

FIGS. 16A-B illustrate aspects of modern, distributed applications that differ from the traditional distributed application discussed above with reference to FIG. 15C. As shown in FIG. 16A, an example modern distributed application 1602 may start out, when initially configured, to have the same seven components distributed among the same three component types as in the traditional application discussed above with reference to FIG. 15C. However, over a period of time 1604, the application may expand 1606 to include many more components, each running within a virtual machine and/or container, and may even expand to include additional component types 1608 and 1609. Furthermore, as shown in FIG. 16B, using the same illustration conventions previously used in FIG. 15F, the mappings of application components to cores in the example multi-core-processor system may be quite dynamic and unstable over time, with components created and destroyed over relatively small intervals of time with respect to the lifetime of the distributed application. With modern distributed applications, the accumulation of metric data by conventional storage of metric data and metric containers corresponding to metric objects in the CMDB-like representation shown in FIG. 15E becomes problematic. For one thing, the lifetime of an individual application component may be insufficiently long to accumulate meaningful metric data. For another, the metric data for a particular type of application component, such as the backend-server components, may be distributed among many different highly dynamic object nodes, which makes processing and analysis of the data difficult.

Figure 17:
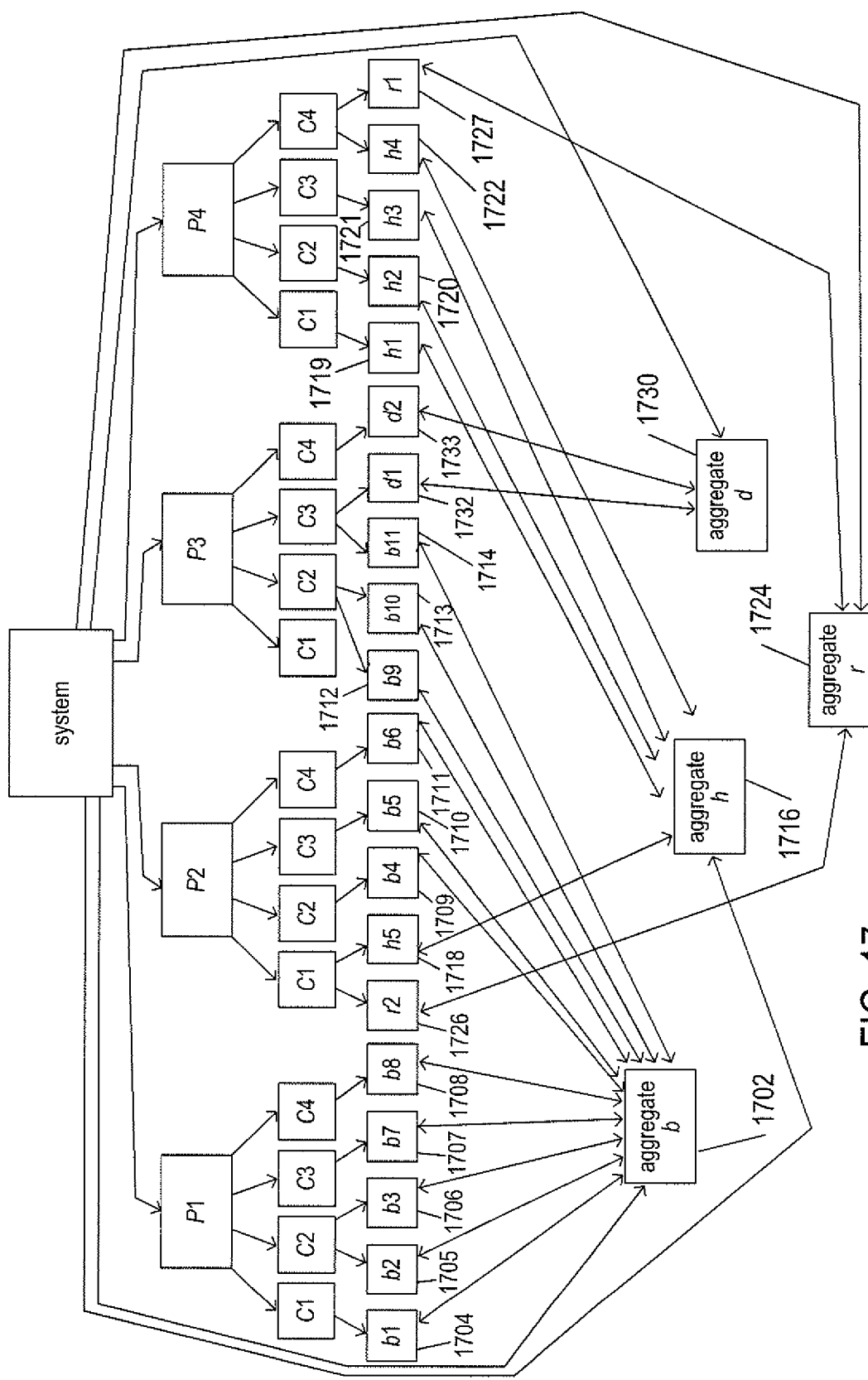
FIGS. 17-18 illustrate an object-entity-aggregation method, using illustration conventions employed in previous figures, that addresses the above-discussed problems associated with collecting metric data for application components of modern, highly dynamic and mobile distributed applications.
Figure 18:
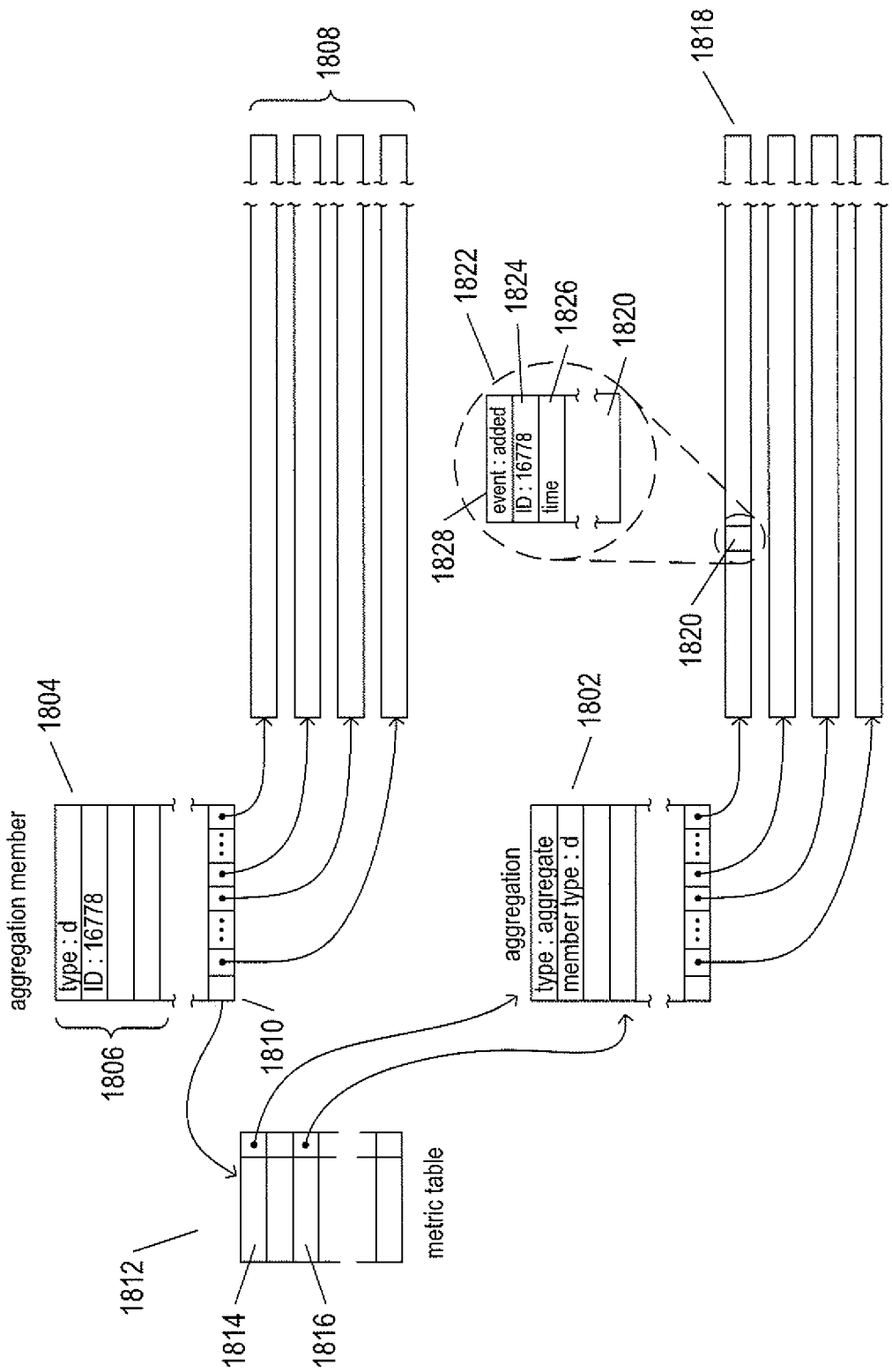

FIGS. 17-18 illustrate an object-entity-aggregation method, using illustration conventions employed in previous figures, that addresses the above-discussed problems associated with collecting metric data for application components of modern, highly dynamic and mobile distributed applications. As shown in FIG. 17, using the CMDB-like graph-like representation of a portion of the configuration and state information for the multi-processor-based system, a new type of node, referred to as an "aggregation node," has been added to the logical representation. A first aggregation node 1702 represents all of the backend-server application components 1704-1714. A second aggregation node 1706 represents the request-processing application components 1718-1722. A third aggregation node 1724 represents all of the application components of type r 1726-1727 and a final aggregation node 1730 represents the database-server application components 1732-1733. An aggregation node is a meta-level node that represents multiple object nodes. In FIG. 17, the aggregation nodes represent all of the object nodes of a particular type but, in alternative implementations, an aggregation node may represent a subset of the nodes of a particular type. Aggregation nodes allow certain of the metrics associated with particular types of object nodes to be accumulated within a single metric container associated with the aggregation node, rather than individual metric containers associated with the object nodes of the type represented by the aggregation node. In other words, the metric data collected by metric entities associated with aggregation nodes is population data generated by multiple object nodes, rather than data generated by a single individual node. Aggregation nodes can therefore be used to collect, process, and analyze population data for types and classes of application components, even though individual application components may have relatively short lifetimes with respect to the overall lifetime of a distributed application and even though application-component nodes may be highly distributed and mobile. The collection of population data for classes of component types can greatly facilitate analysis of distributed-application operational characteristics and behavior, allowing conclusions to be drawn with respect to the performance of classes or subsets of application components over extended periods of time.

FIG. 18 illustrates greater details of aggregation nodes. In FIG. 18, an aggregation node 1802 and an object node of a type aggregated by the aggregation node 1804 are shown. The object node 1804 includes various fields 1806, as discussed above, and references various metric entities that include metric containers 1808. In addition, the object node 1804 includes a reference 1810 to a metric table 1812. The metric table contains entries for metrics associated with the type or class of object nodes to which object node 1804 belongs. Each entry includes an indication of the type of metric as well as a reference to the aggregation node for any of the metrics that are currently being aggregated for the type or class of object node. Thus, the metrics represented by entries 1814 and 1816 are both population metrics accumulated within metric entities associated with the aggregation node 1802. There may be multiple aggregation nodes that accumulate population metrics for any particular class or type of application component. An aggregation node includes a special metric 1818 with entries such as the entry 1820 expanded in inset 1822. Entries in the special metric, such as entry 1820, record when members of the aggregation, object nodes of the type or class being aggregated, are added to the aggregation and deleted from the aggregation, with each addition and deletion event including an object-node ID 1824 and a timestamp 1826, an indication of the event type 1828, and often additional information. The special metric provides information to processing and analysis logic that is useful in understanding the nature of the population of application components represented by the aggregation over time. Special-metric entries, or data points, may include sufficient information to reconstitute the mappings of nodes to processor cores, for example, at different points in time, as represented by the table-like representations shown in FIG. 15F and FIG. 16B.

Figure 19A:
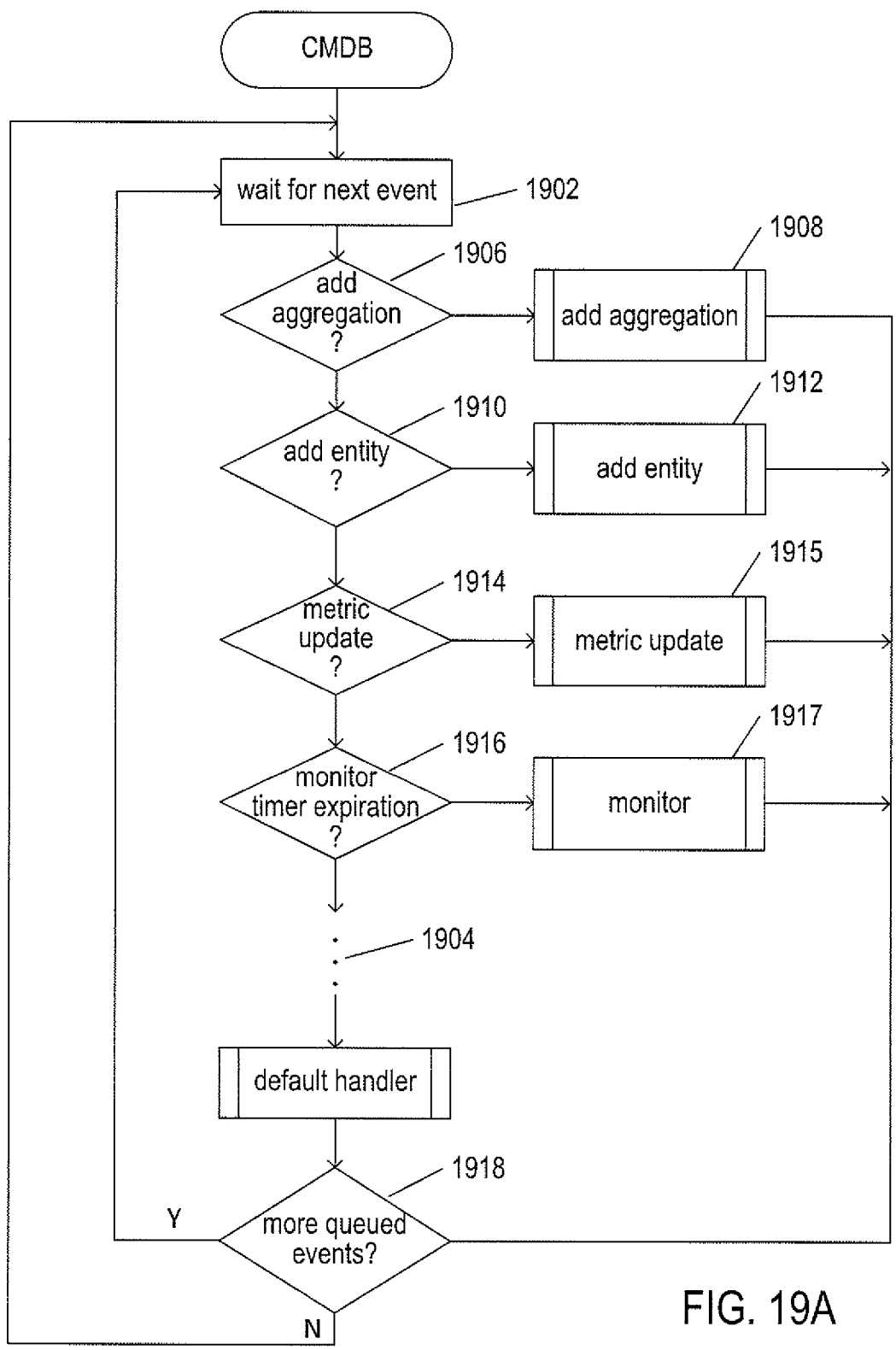
FIGS. 19A-D provide control-flow diagrams that represent supplemental logic for a CMDB representation of the configuration and state of a system that includes aggregation nodes.

FIGS. 19A-D provide control-flow diagrams that represent supplemental logic for a CMDB representation of the configuration and state of a system that includes aggregation nodes. The CMDB logic is represented by an event loop, as shown in FIG. 19A. The CMDB logic waits for a next event, in step 1902, and then handles the event. Events may include an add-aggregation event, an add-entity event, and a metric-update event, among many of the various different possible events that may occur and that may be handled during the lifetime of a CMDB-like representation of the configuration and state of a complex system. Ellipses 1904 indicate that many additional types of events are generally raised and handled. For example, entities, including aggregation entities, may be deleted and population metrics may be added or deleted. When an add-aggregation event occurs, as determined in step 1906, an add-aggregation handler is called in step 1908 to handle the event. When an add-entity event occurs, as determined in step 1910, an add-entity handler is called in step 1912. When a metric-update event occurs, as determined in step 1914, a metric-update handler is called in step 1915. When a monitoring-timer expiration occurs, as determined in step 1916, a monitor handler is called in step 1917. When, following handling of an event, there are more events queued for handling, as determined in step 1918, control returns to step 1906. Otherwise, control returns to step 1902 where the event handler waits for a next event to occur.

Figure 19B:
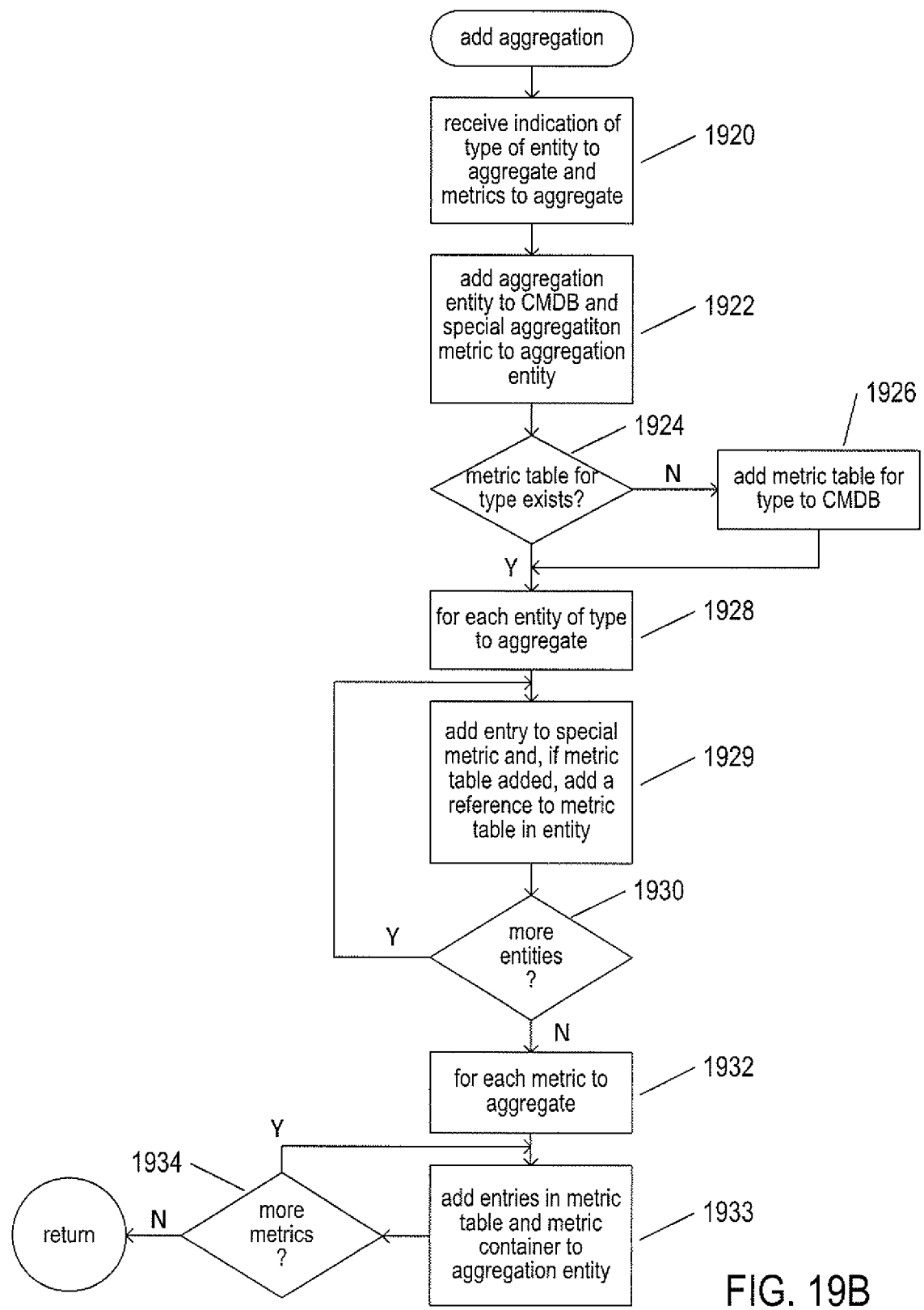

FIG. 19B provides a control-flow diagram for the add-aggregation handler called in step 1908 of FIG. 19A. In step 1920, the handler receives an indication of the type of entity to be aggregated by the aggregation node, a list of metrics to aggregate, and other information needed to construct and maintain a new aggregation node. In step 1922, an aggregation entity is created and added to the CMDB-like configuration-and-state representation along with a special aggregation metric referenced from the aggregation entity. When there is no metric table already created for the type of entity to be aggregated, as determined in step 1924, a metric table is added to the CMDB-like representation in step 1926. In the for-loop of steps 1928-1930, each entity of the type of entity to aggregate is considered. In certain cases, only a subset of the entities of the type are aggregated, in which case only entities of the subset are considered in this for-loop. For each entity that is being aggregated, an entry in the special metric for the aggregation node is added and, when a new metric table is added in step 1926, a reference to the metric table is added to each entity that is being aggregated. In the for-loop of steps 1932-1934, an entry in the metric table is added and a metric entity is added to the aggregation entity for each metric that is being aggregated.

Figure 19C:
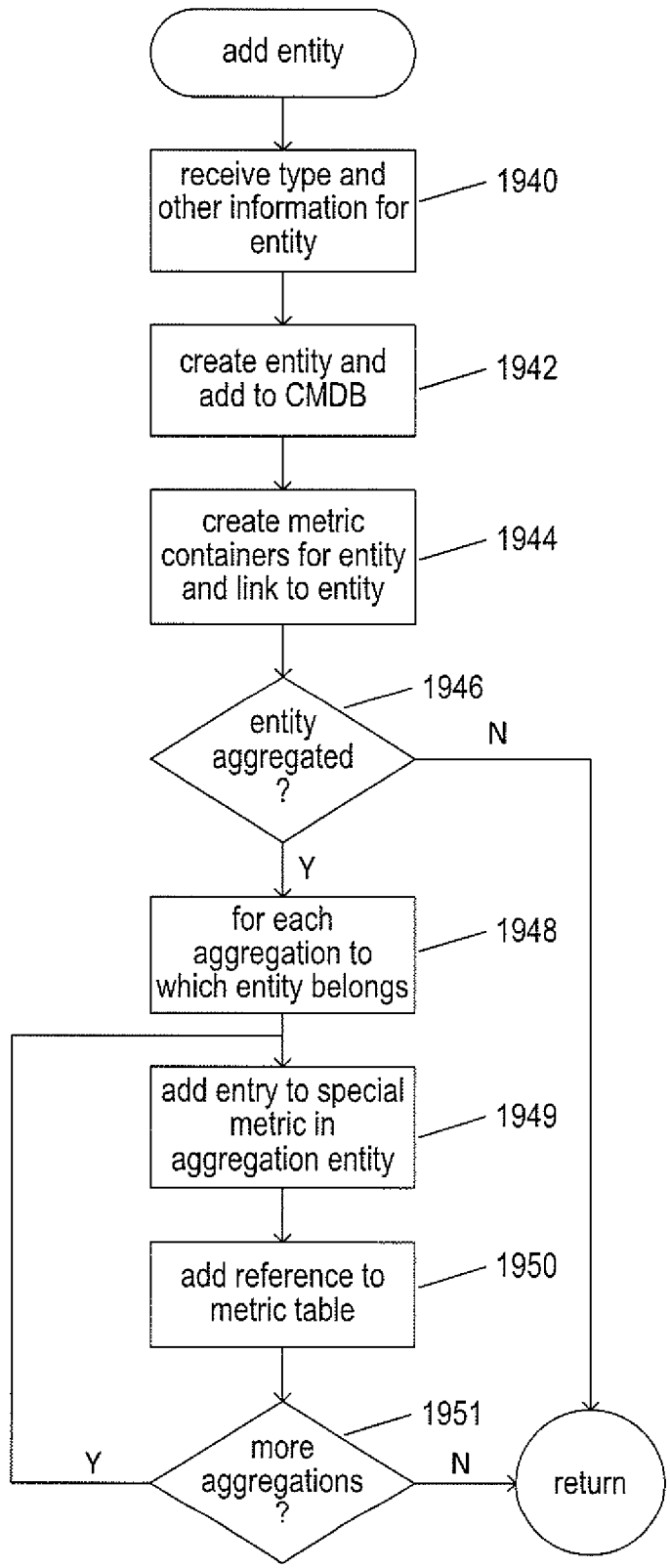

FIG. 19C provides a control-flow diagram for the add-entity handler called in step 1912 of FIG. 19A. In step 1940, the type of entity to add and other information for the entity is received. In step 1942, an entity is created and added to the CMDB-like representation. Metric containers are created and added to the entity in step 1944. When the created entity is an entity that has been aggregated, as determined in step 1946, then, in the for-loop of steps 1948-1951, an entry in the special metric is added to each aggregation node that aggregates a metric associated with the entity and a reference to the metric table for the aggregation is added for those metrics aggregated by the aggregation node in step 1950.

Figure 19D:
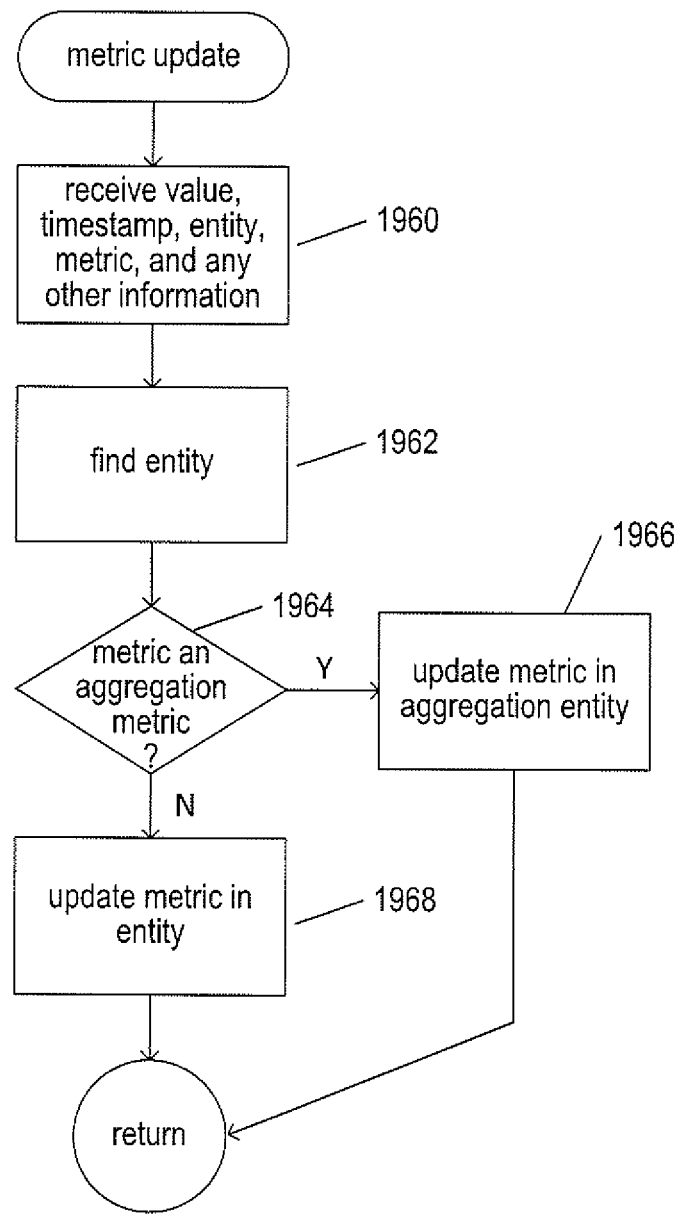

FIG. 19D provides a control-flow diagram for the metric-update handler called in step 1915 of FIG. 19A. In step 1960, the value, timestamp, entity, metric identifier, and other such information needed to update a metric is received. In step 1962, this information is used to find the entity associated with the metric to update. When the metric is an aggregated metric, as determined in step 1964, the metric data is added to a metric container associated with the appropriate aggregation entity, in step 1966. Otherwise, in step 1968, the metric container associated with the entity is updated.

Figure 20A:
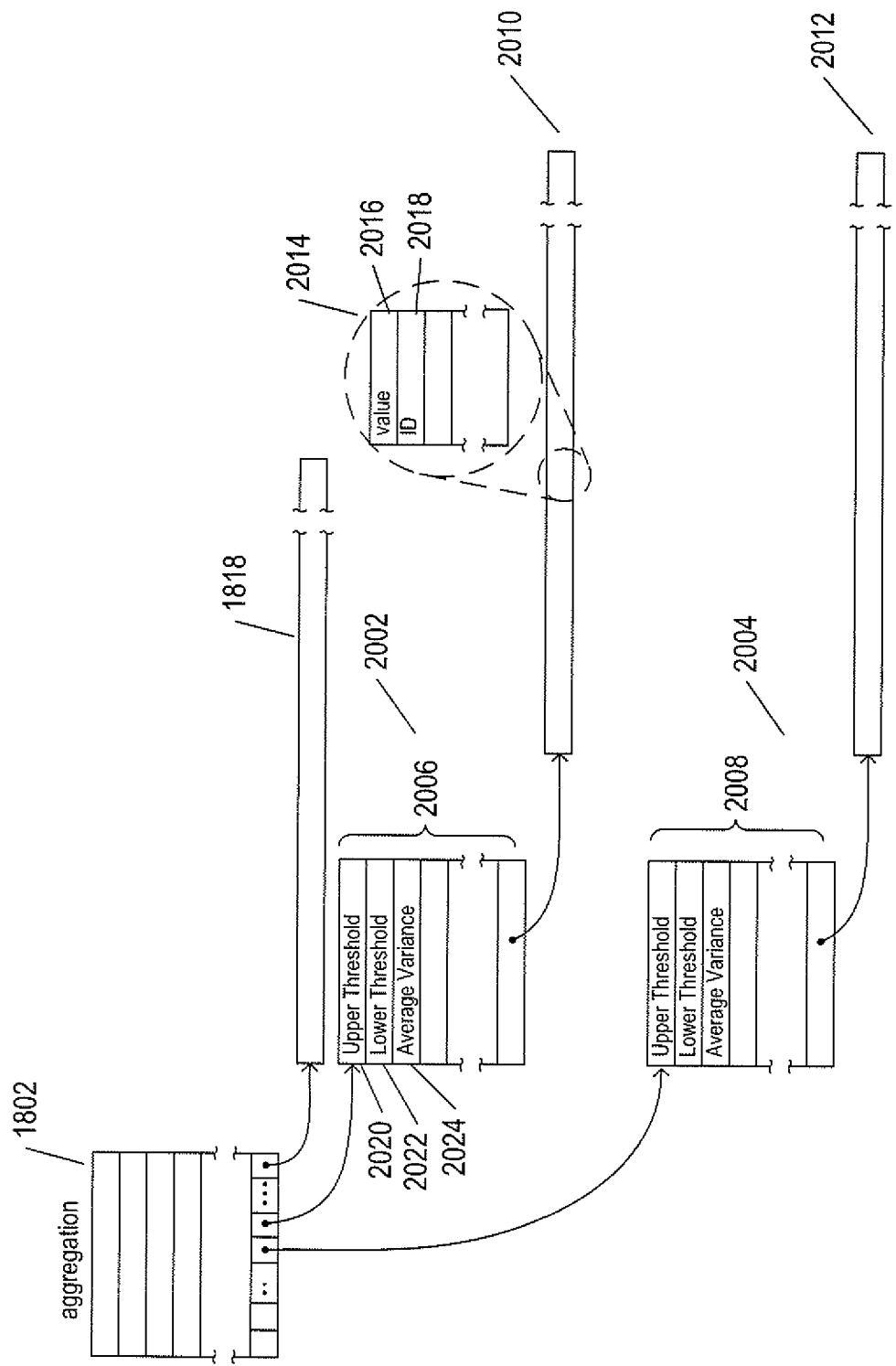
FIG. 20A provides additional details of aggregation entities and population metrics.

FIG. 20A provides additional details of aggregation entities and population metrics. In FIG. 20A, the aggregation entity 1802 previously discussed with reference to FIG. 18 is shown again, along with the special metric 1818. FIG. 20A provides greater details with regard to the non-special population metrics 2002 and 2004. The population metrics each include a number of fields that describe statistical values maintained for the population metrics 2006 and 2008, respectively, in addition to accumulated population-metric data, 2010 and 2012, respectively. As shown in inset 2014, the metric data may include a metric-data value 2016 as well as an ID or other identifier of the aggregated entity that generated the data 2018, in order to facilitate analysis of the population-metric data with respect to individual aggregated entities. In the described implementation, the statistical values maintained for the population metrics include an upper threshold 2020, a lower threshold 2022, and an average variance 2024. These values are computed, over time, from accumulated population-metric data. The variance $\sigma^2$ is computed as the sum of the squared differences between metric values and the mean of the metric values, divided by one less than the number of metric values and the standard deviation $\sigma$ is computed as the square root of the variance. The upper and lower thresholds are computed as the mean metric value plus a first coefficient times the standard deviation and the average mean value minus a second coefficient times the standard deviation, respectively. However, in alternative implementations, many different computed statistical values may be employed for population-metric-monitoring purposes. In alternative implementations, the stored values used for outlier identification may be obtained by machine-learning approaches, and, in particular, on similarity analysis of multi-dimensional key performance indicator data.

Figure 20B:
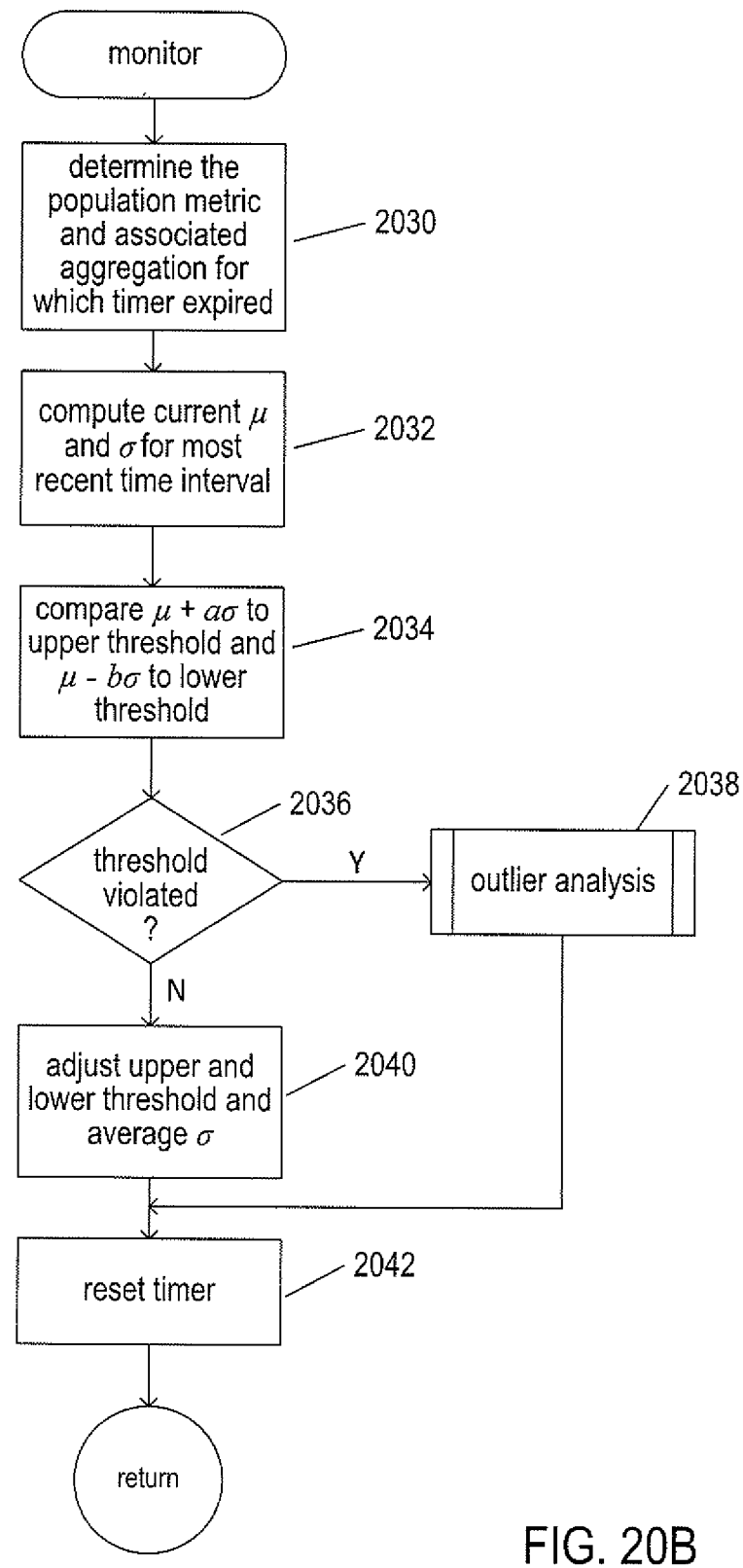
FIGS. 20B-C provide control-flow diagrams for the monitor handler called in step 1917 in FIG. 19A.
Figure 20C:
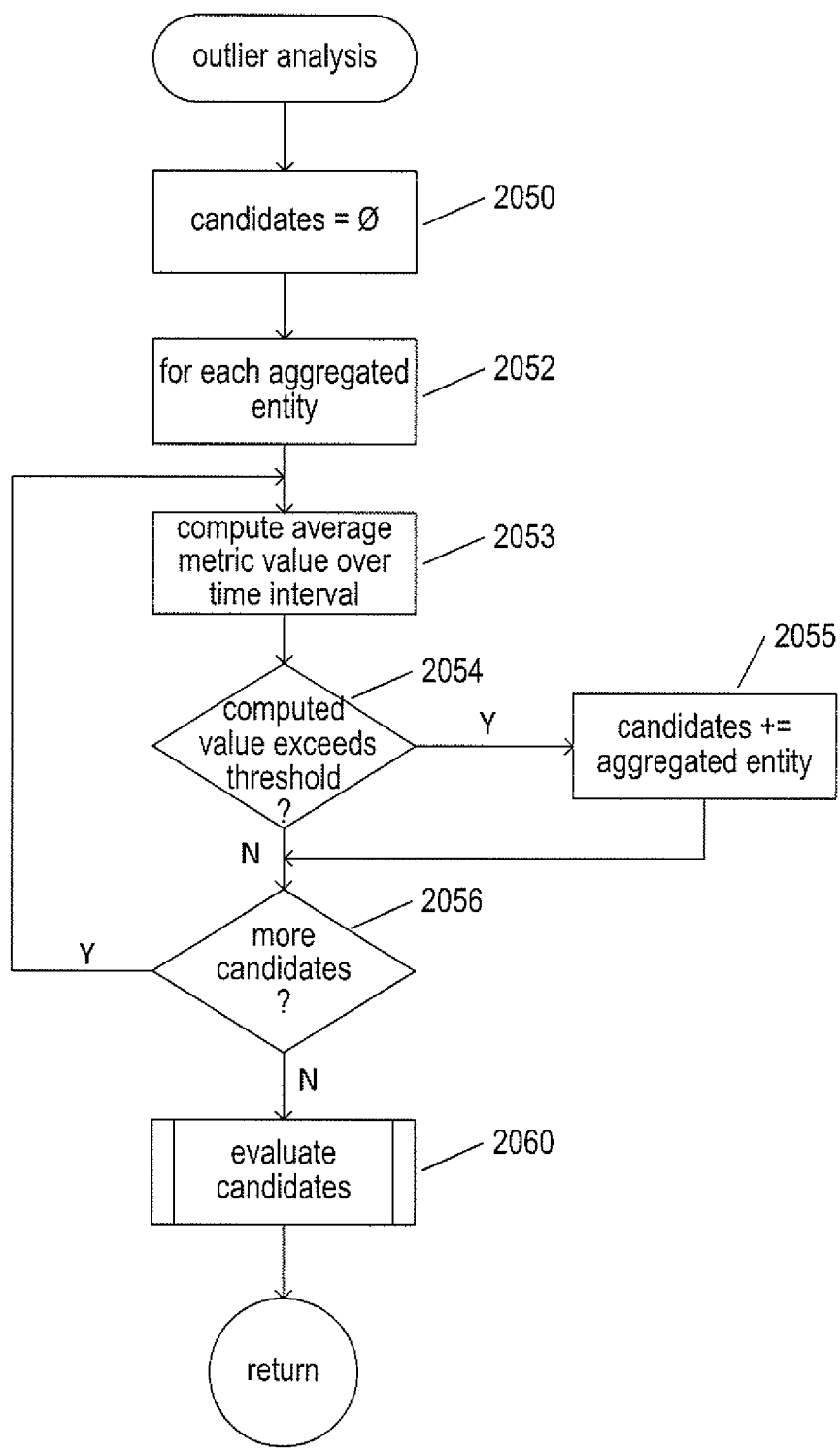

FIGS. 20B-C provide control-flow diagrams for the monitor handler called in step 1917 in FIG. 19A. FIG. 20B provides a control-flow diagram for the monitor handle. In step 2030, the monitor handler determines the population metric and associated aggregation entity with which the expired timer is associated. In step 2032, the monitor handle computes a current mean $\mu$ and variation $\sigma^2$ for a most recent time interval from the accumulated population-metric data. In step 2034, the monitor handler compares the computed values $\mu+\alpha\sigma$ and $\mu-b\sigma$ to the upper and lower thresholds, respectively. When one of the computed values exceeds the respective threshold, in a positive direction for the upper threshold and a negative direction for the lower threshold, as determined in step 2036, the routine "outlier analysis" is called, in step 2038, to determine whether one or more of the aggregated entities represents an outlier with respect to the population metrics and aggregation entity through which it is aggregated. Otherwise, the upper and lower thresholds and average $\sigma^2$ associated with the population metric are adjusted, in step 2040, in view of the currently computed $\mu$ and $\sigma^2$. Finally, in step 2042, the timer is reset.

FIG. 20C shows a control-flow diagram for the routine "outlier analysis" called in step 2038 of FIG. 20B. In step 2050, a set candidates is set to the empty set. In the for-loop of steps 2052-2056, each of the aggregated entities corresponding to the population metric for which the timer expired is considered. In step 2053, the average population-metric value for the aggregated entity is computed, using those population-metric entries with ID fields (2018 in FIG. 20A) corresponding to the currently considered aggregated entity. When this value exceeds one of the thresholds, as determined in step 2054, in a positive direction for the upper threshold or a negative direction for the lower threshold, the aggregated entity is added to the set of candidates in step 2055. Then, in step 2060, the routine "evaluate candidates" is called to determined whether any of the candidate outliers is an outlier with respect to the population metrics associated with the aggregated entities. When a candidate outlier is determined to be an outlier, the CMDB logic triggers and alert or exception to invoke any of various outlier-handling functionalities, including propagating the alert or exception to automated problem diagnosis and amelioration subsystems or to a human system administrator.

Figure 20D:
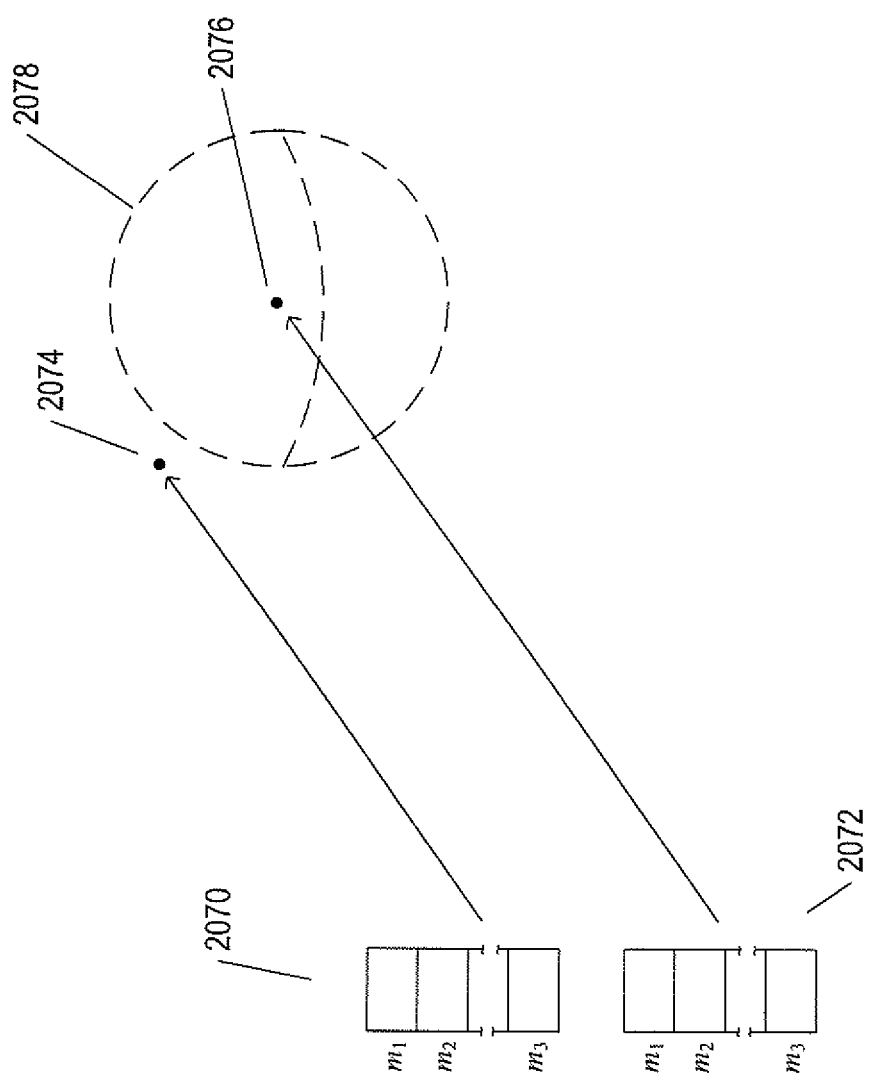
FIG. 20D illustrates one approach for outlier evaluation.

There are many approaches for outlier evaluation. FIG. 20D illustrates one approach. Vectors 2070 and 2072 are constructed for each candidate. The elements of the vectors are the computed average values for each of the different population metrics associated with the candidate aggregated entries. The points in a vector space represented by these vectors 2074 and 2076, respectively, are then evaluated with respect to a vector subspace 2078. When the point represented by a vector falls outside the boundaries of the vector subspace 2078, the associated entity is considered to be an outlier. The vector subspace 2078 is obtained by analysis of the vectors computed for all or a subset of the aggregated entities, over time, and represents an expected distribution of non-outlying vectors. However, there are many other approaches to outlier evaluation, such as determining whether the average population-metric values for the aggregated entity exceed more than a threshold percentage of the associated thresholds maintained in the aggregation entity. Other approaches may be used when other types of statistical quantities are computed and maintained. Following identification of the outliers, the outliers may be ranked according to how much the metrics computed for them different from population-based metrics. For example, using the above vector-space approach, the outliers may be ranked by the distance between the points in the vector space computed for them and the nearest point on the boundary of the vector subspace.

Although the present invention has been described in terms of particular embodiments, it is not intended that the invention be limited to these embodiments. Modifications within the spirit of the invention will be apparent to those skilled in the art. For example, any of many different design and implementation parameters may be varied in order to generate alternative implementations of the aggregation nodes and population metrics discussed above. These design and implementation parameters may include hardware, operating-system, and virtualization-layer types, programming languages, control structures, data structures, modular organization, and other such design and implementation parameters. Although population metrics have been discussed with respect to a particular implementation in which aggregation nodes are added to CMDB-like representations of the state and configuration of distributed systems, similar types of metric populations may be included in many other types of configuration and state representations or other systems in which metric data is collected for components of distributed applications.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A state-information-storage subsystem within a computer system that includes one or more processors, one or more memories, and one or more data-storage devices, the state-information-storage subsystem comprising:
   current state information, including object entities associated with metrics and aggregation entities associated with population metrics, that is maintained within a combination of one or more memories and one or more data-storage devices; and
   a state-information-storage subsystem control component that maintains the current state information and that adds data points to population metrics associated with aggregation entities.

2. The state-information-storage subsystem of claim 1 wherein each metric entity stores a time-ordered sequence of data points, each data point comprising a time-associated numeric data value.

3. The state-information-storage subsystem of claim 2 wherein an aggregation entity aggregates two or more object entities so that data-point-generating events with respect to computer-system components represented by the two or more object entities that produce data points for a population metric associated with the aggregation entity result in storage of the data points by a population metric associated with the aggregation entity.

4. The state-information-storage subsystem of claim 3 wherein an aggregation entity is associated with a special metric that includes entries that represent time-associated addition and deletion events in which object entities are added to and deleted from the aggregation.

5. The state-information-storage subsystem of claim 3 wherein each aggregated object entity includes a reference to a metric table, entries of which indicate an aggregation entity associated with a population metric for metrics that have been aggregated.

6. The state-information-storage subsystem of claim 1 wherein an object entity represents a component of the computer system.

7. The state-information-storage subsystem of claim 1 wherein the state-information-storage subsystem control component generates object entities to represent components of a distributed application that each run within one of a virtual machine, container, and another execution environment.

8. The state-information-storage subsystem of claim 7 wherein the state-information-storage subsystem control component generates an aggregation entity associated with a type of distributed-application component, the aggregation entity associated with a population metric that stores data points representing data generated, with respect to the metric, by distributed-application components of the type that are aggregated by the aggregation entity.

9. The state-information-storage subsystem of claim 8 wherein the aggregation entity is associated with a special metric that includes entries that represent time-associated addition and deletion events in which distributed-application components of the type are added to and deleted from the aggregation.

10. The state-information-storage subsystem of claim 8 wherein each object entity representing a distributed-application component aggregated by the aggregation entity includes one of a reference to a metric table and a metric table, entries of the metric table each indicating an aggregation entity associated with a population metric associated with the object entity.

11. The state-information-storage subsystem of claim 1 wherein the state-information-storage subsystem control component monitors the distribution of population-metric values, for a population metric associated with an aggregation entity that aggregates aggregation entities as an aggregation, to:
  detect candidate aggregated-entity outliers, the distribution of population-metric values generated by a candidate aggregated-entity outlier falling outside a normal population-metric-value distribution for the aggregation of aggregated entities;
  evaluate the candidate aggregated-entity outliers with respect to the population metrics through which they are aggregated; and
  trigger and alarm or exception when a candidate aggregated-entity outlier is determined to be an outlier with respect to the population metrics through which it is aggregated by the aggregation entity.

12. A method that stores and maintains state information with respect to a computer system, within the computer system, the method carried out within the computer system that includes one or more processors, one or more memories, and one or more data-storage devices, the method comprising:
  representing, as objects entities, components of the computer system with respect to which metric-data-point-generating events are associated;
  representing an aggregation of two or more object entities as an aggregation entity;
  associating a population metric with the aggregation entity;
  storing the object entities and aggregation entity as state information in one or more memories and/or data-storage devices; and
  when a metric-data-point-generating event occurs with respect to an object of the aggregation,
    when the metric for which the metric-data-point-generating event generated a data point is the population metric associated with the aggregation entity,
      adding the data-point generated by the data-point-generating event to the population-metric.

13. The method of claim 12 wherein each metric is associated with a stored time-ordered sequence of data points, each data point comprising a time-associated numeric data value.

14. The method of claim 12 wherein multiple object entities within the stored state information represent multiple components of a distributed application, each executing, within one of a virtual machine, container, and another execution environment, that executes within the computer system.

15. The method of claim 14 wherein a distributed-application-representing aggregation entity aggregates two or more object entities that represent components of the distributed application through a population metric associated with the aggregation object.

16. The method of claim 15 wherein the distributed-application-representing aggregation entity is associated with a special metric that includes entries that represent time-associated addition and deletion events in which distributed-application components represented by the aggregated object entities are added to and deleted from the aggregation.

17. The method of claim 14 wherein each distributed-application-component-representing object entity includes a reference to a metric table, entries of which indicate that the distributed-application-representing aggregation entity receives data points generated with respect to the population metric associated with distributed-application-representing aggregation entity.

18. The method of claim 12 further comprising monitoring a distribution of population-metric values, for a population metric associated with an aggregation entity that aggregates aggregation entities as an aggregation, to:
  detect candidate aggregated-entity outliers, the distribution of population-metric values generated by a candidate aggregated-entity outlier falling outside a normal population-metric-value distribution for the aggregation of aggregated entities;
  evaluate the candidate aggregated-entity outliers with respect to the population metrics through which they are aggregated; and
  trigger and alarm or exception when a candidate aggregated-entity outlier is determined to be an outlier with respect to the population metrics through which it is aggregated by the aggregation entity.

19. Computer instructions, stored within a physical data-storage device, that, when executed by one or more processors of a computer system that includes the one or more processors, one or more memories, and one or more data-storage devices, control the computer system to store and maintain state information that describes the state of the computer system, by:
- representing, as objects entities, components of the computer system with respect to which metric-data-point-generating events are associated;
- representing an aggregation of two or more object entities as an aggregation entity;
- associating a population metric with the aggregation entity;
- storing the object entities and aggregation entity as state information in one or more memories and/or data-storage devices; and
- when a metric-data-point-generating event occurs with respect to an object of the aggregation,
  - when the metric for which the metric-data-point-generating event generated a data point is the population metric associated with the aggregation entity, adding the data-point generated by the data-point-generating event to the population-metric.

20. The computer instructions of claim 19
- wherein each metric is associated with a stored time-ordered sequence of data points, each data point comprising a time-associated numeric data value;
- wherein a distributed-application-representing aggregation entity aggregates two or more object entities that represent components of the distributed application through a population metric associated with the aggregation object;
- wherein the distributed-application-representing aggregation entity is associated with a special metric that includes entries that represent time-associated addition and deletion events in which distributed-application components represented by the aggregated object entities are added to and deleted from the aggregation; and
- wherein each distributed-application-component-representing object entity includes a reference to a metric table, entries of which indicate that the distributed-application-representing aggregation entity receives data points generated with respect to the population metric associated with distributed-application-representing aggregation entity.

* * * * *